United States Patent
Kino

(10) Patent No.: US 9,143,651 B2
(45) Date of Patent: Sep. 22, 2015

(54) IMAGE FORMING APPARATUS, CHARGING INFORMATION RECORDING METHOD, AND RECORDING MEDIUM

(75) Inventor: Tetsuro Kino, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 821 days.

(21) Appl. No.: 12/840,530

(22) Filed: Jul. 21, 2010

(65) Prior Publication Data

US 2011/0019821 A1    Jan. 27, 2011

(30) Foreign Application Priority Data

Jul. 27, 2009 (JP) ................................ 2009-174608

(51) Int. Cl.
*H04L 29/00* (2006.01)
*H04N 1/34* (2006.01)
(Continued)

(52) U.S. Cl.
CPC ............ *H04N 1/344* (2013.01); *G03G 15/502* (2013.01); *G03G 15/5075* (2013.01); *G03G 21/02* (2013.01); *G06F 17/289* (2013.01); *G06Q 30/04* (2013.01); *H04N 1/00244* (2013.01); *H04N 1/00411* (2013.01); *H04N 1/00424* (2013.01); *H04N 1/00474* (2013.01); *H04N 1/00514* (2013.01); *H04N 1/32112* (2013.01); *H04N 1/32122* (2013.01); *H04N 1/4486* (2013.01); *G03G 2215/00109* (2013.01); *H04N 2201/001* (2013.01); *H04N 2201/0039* (2013.01);
(Continued)

(58) Field of Classification Search
CPC .......... H04L 45/00; G06F 17/50; G06K 9/00; G06Q 30/04
See application file for complete search history.

(56) References Cited

U.S. PATENT DOCUMENTS

| 2002/0073003 A1 | 6/2002 | Levine |
| 2003/0117642 A1 | 6/2003 | Haraguchi |

(Continued)

FOREIGN PATENT DOCUMENTS

| CN | 101094282 A | 12/2007 |
| EP | 1 197 837 A2 | 4/2002 |

(Continued)

OTHER PUBLICATIONS

U.S. Appl. No. 12/795,163, filed Jun. 7, 2010, Kino.

(Continued)

*Primary Examiner* — Joseph P Hirl
*Assistant Examiner* — Leynna Truvan
(74) *Attorney, Agent, or Firm* — Oblon, McClelland, Maier & Neustadt, L.L.P.

(57) ABSTRACT

An image forming apparatus includes a unit for receiving process information indicating a list of processes used in a process flow requested by an information processing apparatus connected via a network; a unit for executing a process that the image forming apparatus is requested to execute, and recording charging information, which is relevant to the executed process, in charging information record data of the process flow; a unit for transferring the charging information record data to a service providing device that is requested to execute another process; a unit for receiving the charging information record data in which charging information, which is relevant to the other process executed by the service providing device, has been recorded by the service providing device; and a unit for recording, in a storage unit, the charging information record data in which charging information are recorded in association with the corresponding processes in the list.

10 Claims, 23 Drawing Sheets

(51) Int. Cl.
*G03G 21/02* (2006.01)
*G06F 17/28* (2006.01)
*G06Q 30/04* (2012.01)
*H04N 1/00* (2006.01)
*H04N 1/32* (2006.01)
*H04N 1/44* (2006.01)
*G03G 15/00* (2006.01)

(52) U.S. Cl.
CPC *H04N2201/3205* (2013.01); *H04N 2201/3208* (2013.01); *H04N 2201/3219* (2013.01); *H04N 2201/3222* (2013.01)

(56) References Cited

U.S. PATENT DOCUMENTS

| | | |
|---|---|---|
| 2003/0145218 A1 | 7/2003 | Hutchison |
| 2003/0197885 A1 | 10/2003 | Takeo |
| 2005/0162696 A1 | 7/2005 | Helms et al. |
| 2007/0046974 A1 | 3/2007 | Machida |
| 2007/0182984 A1* | 8/2007 | Ragnet et al. ............ 358/1.15 |
| 2007/0296994 A1 | 12/2007 | Radiya |
| 2008/0044191 A1 | 2/2008 | Akazawa |
| 2008/0225320 A1 | 9/2008 | Ferlitsch |
| 2008/0252918 A1 | 10/2008 | Nagata |
| 2009/0044104 A1 | 2/2009 | Hashimoto |
| 2009/0077164 A1 | 3/2009 | Phillips et al. |
| 2010/0067036 A1* | 3/2010 | Oka ............................ 358/1.14 |

FOREIGN PATENT DOCUMENTS

| | | |
|---|---|---|
| EP | 1 677 245 A1 | 7/2006 |
| EP | 2 071 459 A1 | 6/2009 |
| JP | 2004-133921 | 4/2004 |
| JP | 2004-289684 A | 10/2004 |
| JP | 2006-195893 A | 7/2006 |
| JP | 2007-60186 A | 3/2007 |
| JP | 2008-10993 | 1/2008 |
| JP | 2008-59232 | 3/2008 |
| WO | WO 2010/103877 A1 | 9/2010 |

OTHER PUBLICATIONS

Extended European Search Report issued Nov. 30, 2010 in EP 10 25 1290.

Japanese Office Action issued Apr. 23, 2013 in Patent Application No. 2009-174608.

Combined Chinese Office Action and Search Report issued May 15, 2013 in Patent Application No. 201010236754.9 with English Translation.

* cited by examiner

FIG.6

| WIDGET ID | trans_copy001 | | | |
|---|---|---|---|---|
| USER ID | USER A | | | |
| WIDGET ADDRESS | http://xxx/xxx/yyy | | | |
| DISPLAY NAME | TRANSLATION COPY | | | |
| PROCESS FLOW INFORMATION | SERVICE NAME | PROVIDER NAME | URL | SETTING INFORMATION |
| | SCAN | ABC | | ..... |
| | OCR | O×service Co., Ltd. | http://O×.co.jp/O×service | ..... |
| | TRANSLATION | △▲service Co., Ltd. | http://△▲.co.jp/△▲service | ..... |
| | PRINT | ABC | | ..... |

FIG.7

| USER ID | WIDE INFORMATION ACQUIRING URL |
|---------|-------------------------------|
| USER A  | http://xxxxxxxxxxxxx          |
| USER B  | .....                         |
| :       | :                             |

| WIDGET ID | trans_copy001 | | | |
|---|---|---|---|---|
| USER ID | USER A | | | |
| WIDGET ADDRESS | http://xxx/xxx/yyy | | | |
| DISPLAY NAME | TRANSLATION COPY | | | |
| PROCESS FLOW INFORMATION | SERVICE NAME | PROVIDER NAME | URL | SETTING INFORMATION |
| | SCAN | ABC | | ..... |
| | OCR | ○×service Co., Ltd. | http://○×.co.jp/○×service | ..... |
| | TRANSLATION | △▲service Co., Ltd. | http://△▲.co.jp/△▲service | ..... |
| | PRINT | ABC | | ..... |
| WIDGET RELAY URL | http://yyyyyyyy | | | |

FIG.13

| JOB TRACKING ID | job001 | | | | |
|---|---|---|---|---|---|
| PROCESS FLOW INFORMATION | SERVICE NAME | CHARGING DEGREE | PROVIDER NAME | URL | SETTING INFORMATION | EXECUTION RESULT |
| | SCAN | | ABC | | ..... | |
| | OCR | | O×service Co., Ltd. | http://O×.co.jp/O×service | ..... | |
| | TRANSLATION | | △▲service Co., Ltd. | http://△▲.co.jp/△▲service | ..... | |
| | PRINT | | ABC | | ..... | |

FIG.14

| JOB TRACKING ID | job001 | | | | | |
|---|---|---|---|---|---|---|
| | SERVICE NAME | CHARGING DEGREE | PROVIDER NAME | URL | SETTING INFORMATION | EXECUTION RESULT |
| PROCESS FLOW INFORMATION | SCAN | 1 | ABC | | ..... | OK |
| | OCR | 2 | ○×service Co., Ltd. | http://○×.co.jp/○×service | ..... | OK |
| | TRANSLATION | 5 | △▲service Co., Ltd. | http://△▲.co.jp/△▲service | ..... | OK |
| | PRINT | 1 | ABC | | ..... | OK |

FIG.17

| JOB TRACKING ID | | | job001 | | | |
|---|---|---|---|---|---|---|
| | SERVICE NAME | CHARGING DEGREE | PROVIDER NAME | URL | SETTING INFORMATION | EXECUTION RESULT |
| PROCESS FLOW INFORMATION | SCAN | 1 | ABC | | ..... | OK |
| | OCR | | O×service Co., Ltd. | http://O×.co.jp/O×service | ..... | NG |
| | TRANSLATION | | △▲service Co., Ltd. | http://△▲.co.jp/△▲service | ..... | |
| | PRINT | | ABC | | | |

FIG.18

| JOB TRACKING ID | | job001 | | | | |
|---|---|---|---|---|---|---|
| | SERVICE NAME | CHARGING DEGREE | PROVIDER NAME | URL | SETTING INFORMATION | EXECUTION RESULT |
| PROCESS FLOW INFORMATION | SCAN | 0 | ABC | | ...... | OK |
| | OCR | | ○×service Co., Ltd. | http://○×.co.jp/○×service | ...... | NG |
| | TRANSLATION | | △▲service Co., Ltd. | http://△▲.co.jp/△▲service | ...... | |
| | PRINT | | ABC | | ...... | |

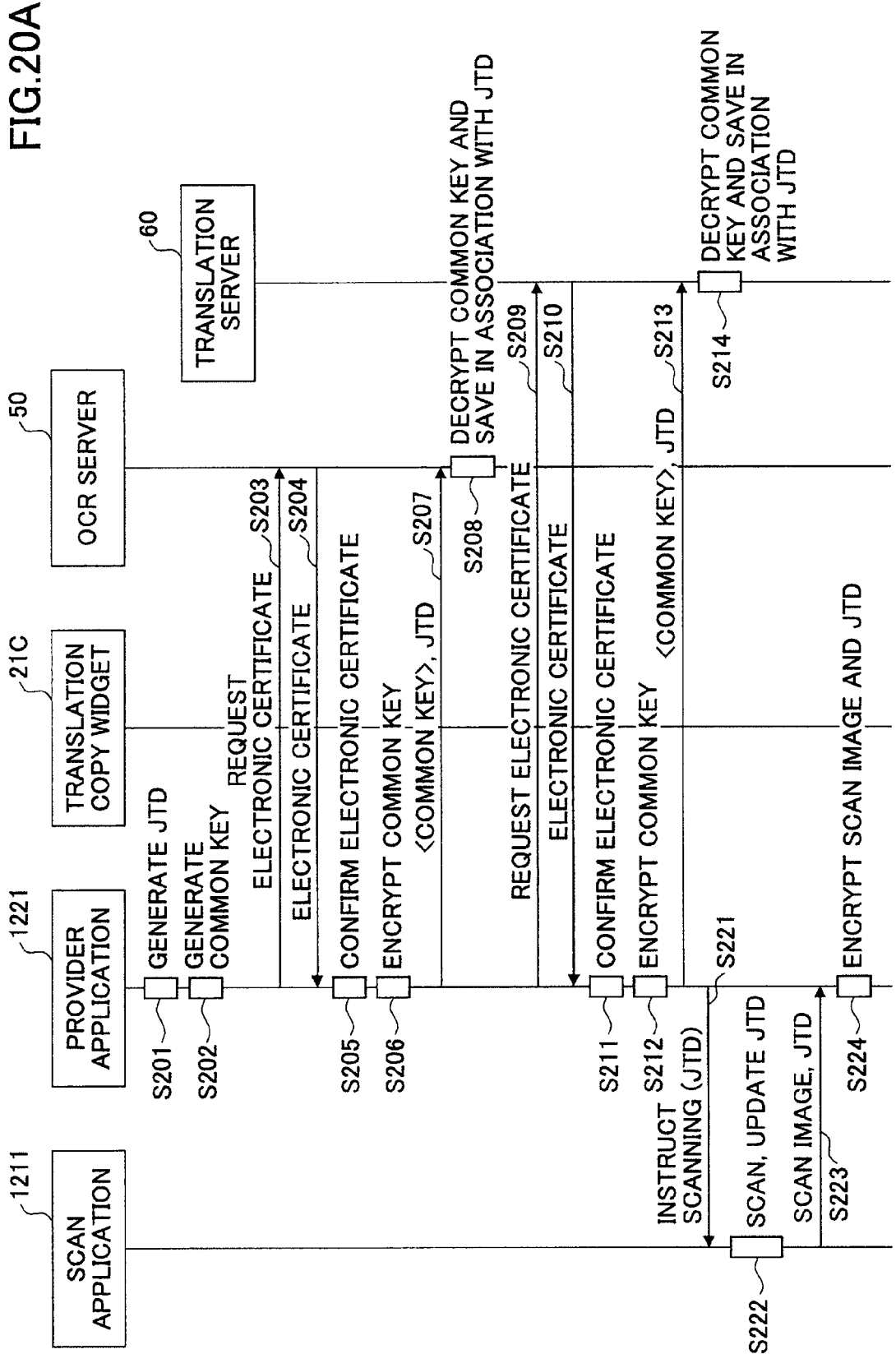

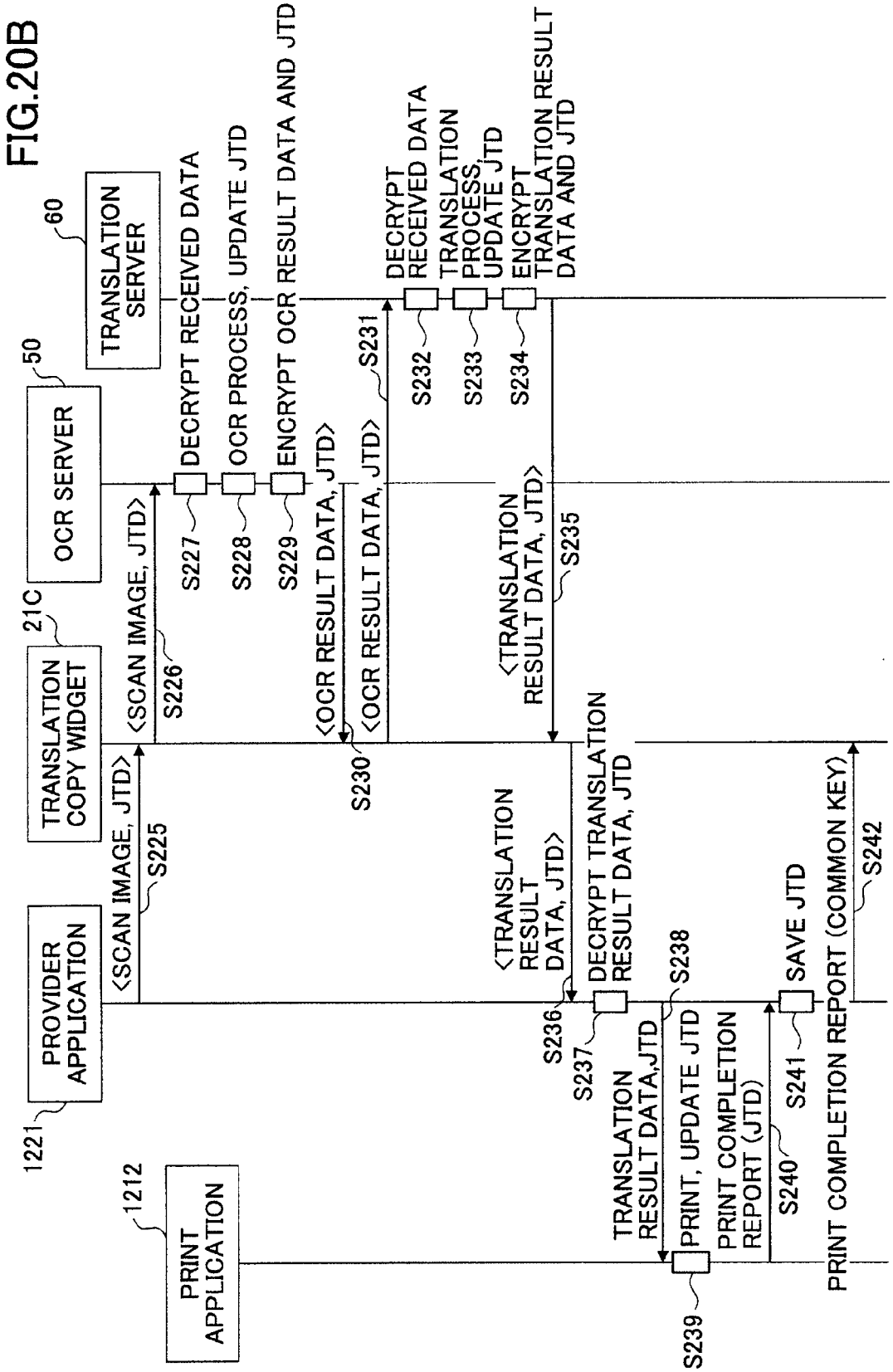

FIG.21

| WIDGET ID | | trans_copy001 | |
|---|---|---|---|
| USER ID | | USER A | |
| WIDGET ADDRESS | | http://xxx/xxx/yyy | |
| DISPLAY NAME | | TRANSLATION COPY | |
| PROCESS FLOW INFORMATION | SERVICE NAME | PROVIDER NAME | URL | SETTING INFORMATION |
| | SCAN | ABC | | ..... |
| | OCR | O×service Co., Ltd. | http://O×.co.jp/O×service | ..... |
| | TRANSLATION | △▲service Co., Ltd. | http://△▲.co.jp/△▲service | ..... |
| | PRINT | ABC | | ..... |
| | TRANSLATION COPY WIDGET | | | |

FIG.22

| WIDGET ID | trans_copy001 | | | |
|---|---|---|---|---|
| USER ID | USER A | | | |
| WIDGET ADDRESS | http://xxx/xxx/yyy | | | |
| DISPLAY NAME | TRANSLATION COPY | | | |
| PROCESS FLOW INFORMATION | SERVICE NAME | PROVIDER NAME | URL | SETTING INFORMATION |
| | SCAN | ABC | | ..... |
| | OCR | O×service Co., Ltd. | http://O×.co.jp/O×service | ..... |
| | TRANSLATION | △▲service Co., Ltd. | http://△▲.co.jp/△▲service | ..... |
| | PRINT | ABC | | ..... |
| KEY REQUEST FLAG | TRUE | | | |

IMAGE FORMING APPARATUS, CHARGING INFORMATION RECORDING METHOD, AND RECORDING MEDIUM

BACKGROUND OF THE INVENTION

1. Field of the Invention

The present invention relates to an image forming apparatus, a charging information recording method, and a recording medium for recording charging information.

2. Description of the Related Art

In recent years, there has been proposed a mechanism in which an image forming apparatus operates in collaboration with an application executed in another computer connected via a network (see, for example, Japanese Laid-Open Patent Application No. 2008-10993).

Meanwhile, there is an image forming apparatus provided with a function for charging fees for using each of the functions of the image forming apparatus, such as copying, printing, fax transmission, and scanning. Such an image forming apparatus has a counter installed in its storage device for each function, to record the usage status of each function. Every time a function is used, the counter is incremented. When an image forming apparatus is installed in an office under a lease contract, a serviceman of the manufacturer of the image forming apparatus periodically confirms the counters, and collects the charged fees. An image forming apparatus may be provided with a coin rack, so that the charged fee is collected every time the image forming apparatus is used (for example, every time a copy is taken).

However, the service of the image forming apparatus may be executed in collaboration with an external application that is fee-based. In this case, the fee for the service provided by the application is charged by the provider of the application. Therefore, even when the user has used only a single service, the user may be charged a fee from the image forming apparatus and also from the external application. If the fees are charged at separate timings (for example, if the bills are sent at different timings), the user may be confused. Furthermore, if the charging format is specific (e.g., if the fee is charged depending on volume), the user would have to compare his usage status with plural bills. Hence, the user would have difficulty in confirming whether the charged fee is legitimate.

SUMMARY OF THE INVENTION

The present invention provides an image forming apparatus, a charging information recording method, and a recording medium, in which one or more of the above-described disadvantages are eliminated.

A preferred embodiment of the present invention provides an image forming apparatus, a charging information recording method, and a recording medium with which a simple mechanism is implemented for charging fees for a service that is provided by collaboration of an image forming apparatus and an external application.

According to an aspect of the present invention, there is provided an image forming apparatus including a process information receiving unit configured to receive process information indicating a list of processes used in a process flow requested by an information processing apparatus connected to the image forming apparatus via a network; a process execution unit configured to execute a process that the image forming apparatus is requested to execute among the processes in the list, and record, in charging information record data of the process flow, a first item of charging information that is relevant to the executed process; a data transfer unit configured to transfer the charging information record data to a service providing device that is requested to execute another process among the processes in the list; a data receiving unit configured to receive the charging information record data in which a second item of the charging information, which is relevant to the other process executed by the service providing device, has been recorded by the service providing device; and a charging information recording unit configured to record, in a charging information storage unit, the charging information record data in which items of the charging information are recorded in association with the corresponding processes in the list.

According to an aspect of the present invention, there is provided a charging information recording method executed by an image forming apparatus, the charging information recording method including a process information receiving step of receiving process information indicating a list of processes used in a process flow requested by an information processing apparatus connected to the image forming apparatus via a network; a process execution step of executing a process that the image forming apparatus is requested to execute among the processes in the list, and recording, in charging information record data of the process flow, a first item of charging information that is relevant to the executed process; a data transfer step of transferring the charging information record data to a service providing device that is requested to execute another process among the processes in the list; a data receiving step of receiving the charging information record data in which a second item of the charging information, which is relevant to the other process executed by the service providing device, has been recorded by the service providing device; and a charging information recording step of recording, in a charging information storage unit, the charging information record data in which items of the charging information are recorded in association with the corresponding processes in the list.

According to an aspect of the present invention, there is provided a computer-readable recording medium recording a program that causes an image forming apparatus to execute a method including a process information receiving step of receiving process information indicating a list of processes used in a process flow requested by an information processing apparatus connected to the image forming apparatus via a network; a process execution step of executing a process that the image forming apparatus is requested to execute among the processes in the list, and recording, in charging information record data of the process flow, a first item of charging information that is relevant to the executed process; a data transfer step of transferring the charging information record data to a service providing device that is requested to execute another process among the processes in the list; a data receiving step of receiving the charging information record data in which a second item of the charging information, which is relevant to the other process executed by the service providing device, has been recorded by the service providing device; and a charging information recording step of recording, in a charging information storage unit, the charging information record data in which items of the charging information are recorded in association with the corresponding processes in the list.

According to one embodiment of the present invention, an image forming apparatus, a charging information recording method, and a recording medium are provided, with which a simple mechanism is implemented for charging fees for a service that is provided by collaboration of an image forming apparatus and an external application.

BRIEF DESCRIPTION OF THE DRAWINGS

Other objects, features and advantages of the present invention will become more apparent from the following detailed description when read in conjunction with the accompanying drawings, in which:

FIG. 6 illustrates an example of widget information of a translation copy widget;

FIG. 7 illustrates an example of a user management table;

FIG. 10 illustrates an example of widget information of the translation copy widget that is sent from a widget manager to a provider application;

FIG. 13 illustrates an example of job tracking data;

FIG. 14 illustrates an example of job tracking data in which charging degrees and execution results are recorded;

FIG. 17 illustrates an example of job tracking data when an error has occurred;

FIG. 18 illustrates an example of job tracking data including the nullified charging degree;

FIGS. 20A and 20B illustrate a sequence diagram for describing processing procedures performed when executing a process flow of the translation copy widget according to the second embodiment;

FIG. 21 illustrates an example of widget information including a request for image data corresponding to the final product; and FIG. 22 illustrates an example of widget information including information indicating whether a common key is necessary.

DETAILED DESCRIPTION OF THE PREFERRED EMBODIMENTS

A description is given, with reference to the accompanying drawings, of embodiments of the present invention.

Figure 1:
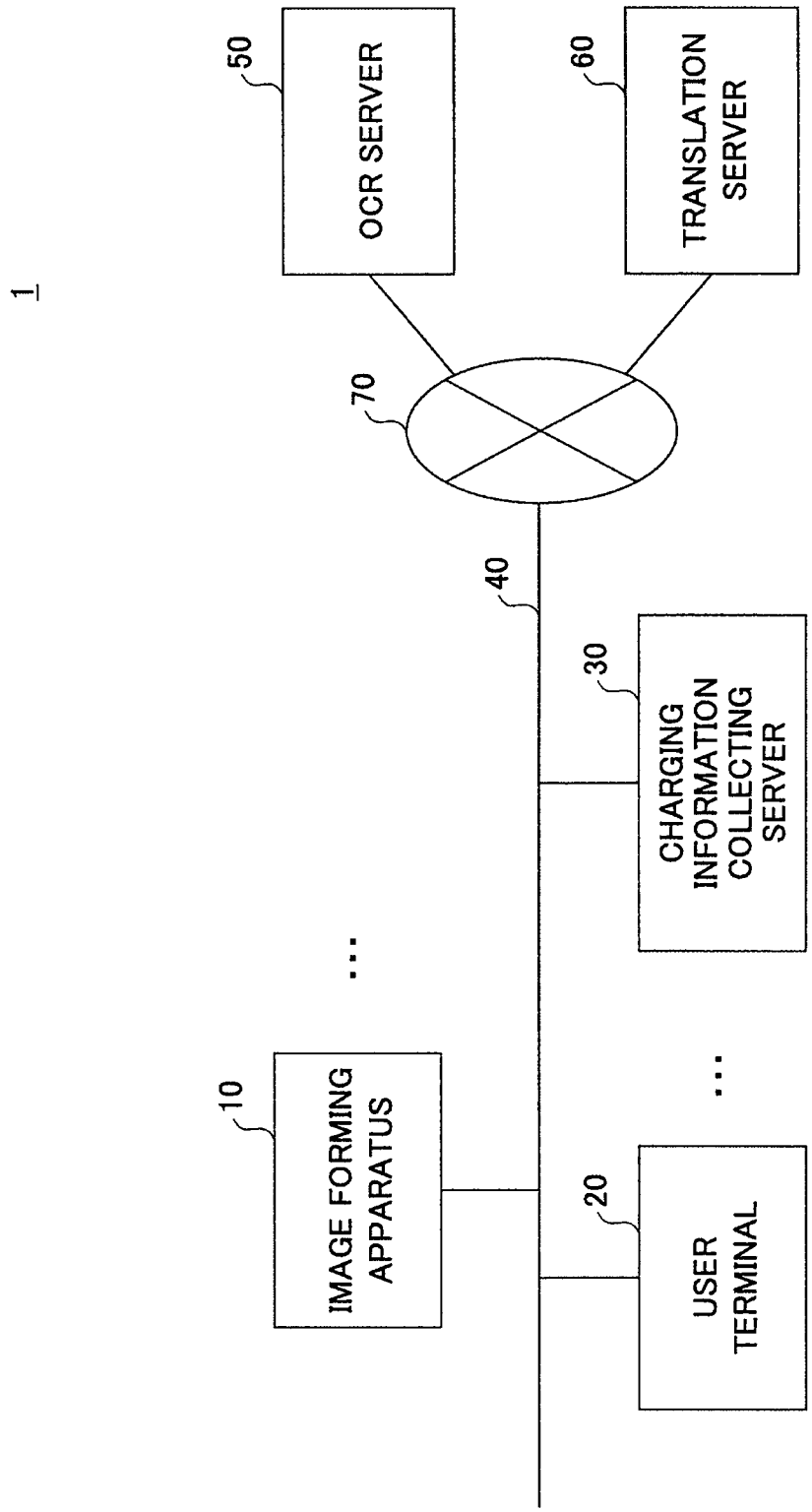
FIG. 1 illustrates a configuration of an information processing system according to an embodiment of the present invention.

FIG. 1 illustrates a configuration of an information processing system according to an embodiment of the present invention. An information processing system 1 includes at least one image forming apparatus 10, at least one user terminal 20, and a charging information collecting server 30, which are connected to each other via a network 40 (wired or wireless) such as a LAN (Local Area Network). An OCR server 50 and a translation server 60 are connected to the network 40 via a wide area network 70 such as the Internet.

The image forming apparatus 10 is a multifunction peripheral for implementing plural functions (image forming functions) in a single unit, such as printing, scanning, copying, and fax transmission functions. However, the image forming apparatus 10 may be a device for implementing one function (e.g., a printer, a scanner, a copier, or a fax machine). The image forming apparatus 10 records charging information relevant to an image forming function that has been used, in a nonvolatile recording medium such as a HDD (Hard Disk Drive).

The user terminal 20 is a personal terminal used by a user, in which software programs can be installed and executed. The user terminal 20 is not limited to any particular devices as long as it has a communications function. Examples of the user terminal 20 are information processing devices such as a desktop PC (Personal Computer), a notebook PC, a PDA (Personal Digital Assistance), and a mobile phone.

The charging information collecting server 30 is a computer for periodically collecting charging information recorded in each image forming apparatus 10 connected to the network 40, and managing the charging information in an integrated manner. The charging information collecting server 30 can cause a display device to display the managed charging information, and cause the image forming apparatus 10 to print out the managed charging information. For example, a serviceman of the image forming apparatus 10 may use the charging information collecting server 30 to charge a fee to a user of the image forming apparatus 10. The charging information collecting server 30 does not necessarily need to be provided. Each image forming apparatus 10 may individually manage its charging information. In this case, the serviceman collects charging information from each image forming apparatus 10.

The OCR server 50 is an example of a service providing device, which is a computer including an application program for providing an OCR (Optical Character Recognition) function as a Web service (translation service) in the network.

The translation server 60 is an example of a service providing device, which is a computer including an application program for providing a function for translating (for example, translating English into Japanese) document data (for example, text data) as a Web service (translation service) in the network.

The OCR server 50 and the translation server 60 charge fees for their services. In the following description, it is assumed that the OCR server 50 and the translation server 60 are respectively operated by different companies from the provider of the image forming apparatus 10.

Figure 2:
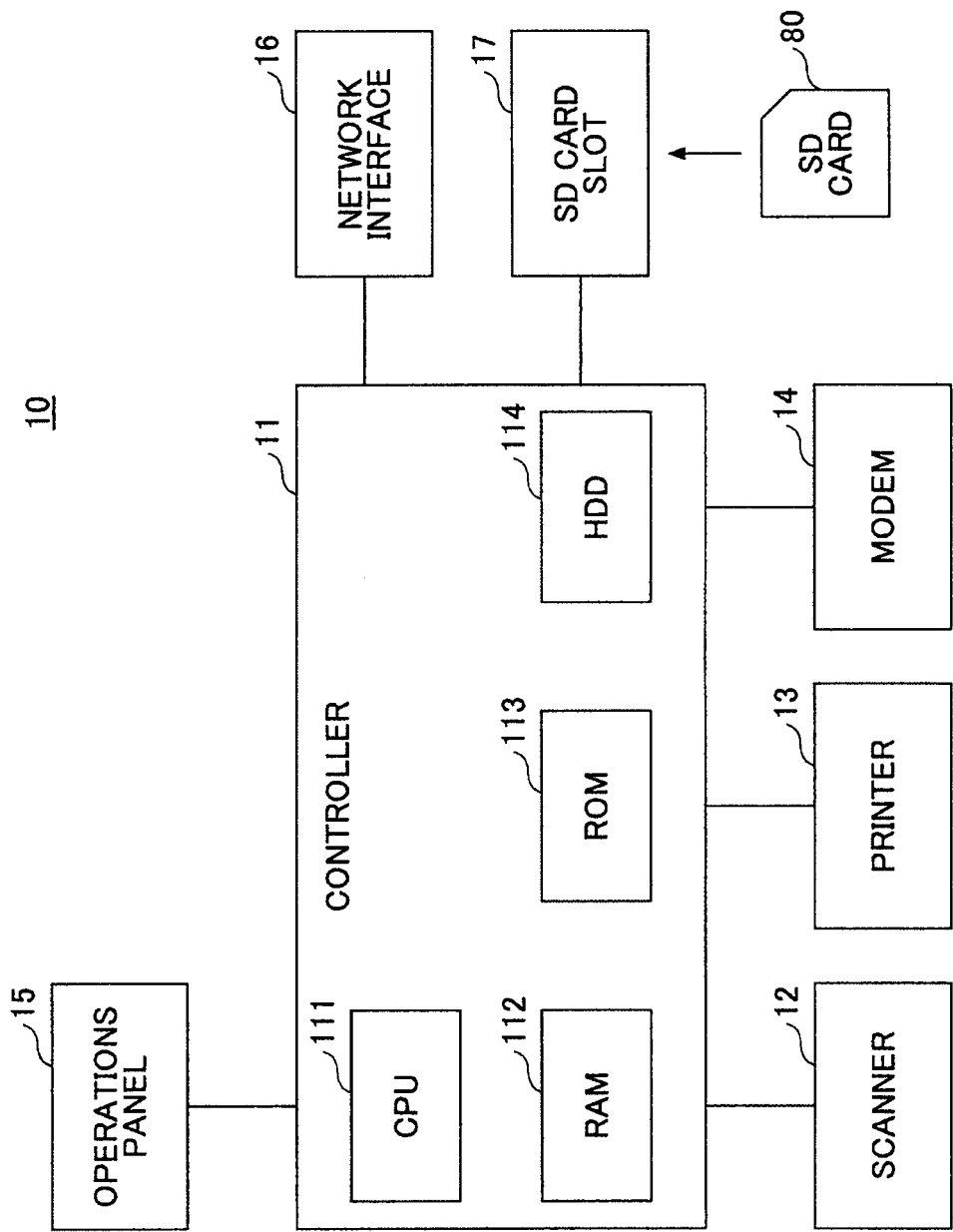
FIG. 2 illustrates a hardware configuration of an image forming apparatus according to an embodiment of the present invention.

FIG. 2 illustrates a hardware configuration of the image forming apparatus 10 according to an embodiment of the present invention. As shown in FIG. 2, the image forming apparatus 10 includes hardware elements such as a controller 11, a scanner 12, a printer 13, a modem 14, an operations panel 15, a network interface 16, and an SD card slot 17.

The controller 11 includes a CPU 111, a RAM 112, a ROM 113, and a HDD 114. The ROM 113 records various programs and data used by the programs. The RAM 112 is used as a storage area for loading programs and a work area for the loaded programs. The CPU 111 processes the programs loaded in the RAM 112 to implement various functions. The HDD 114 records programs and various data items used by the programs.

The scanner 12 is a hardware element for scanning an original to obtain image data. The printer 13 is a hardware element for printing data onto a sheet. The modem 14 is a hardware element for connecting the image forming apparatus 10 to a telephone line to transmit and receive image data by fax communications. The operations panel 15 is a hardware element including an input unit such as a pointer for receiving input from a user, and a display unit such as a liquid crystal panel. The network interface 16 is a hardware element for connecting the image forming apparatus 10 to a network (wired or wireless) such as LAN. The SD card slot 17 is used for reading programs recorded in an SD card 80. In the image forming apparatus 10, in addition to programs recorded in the ROM 113, programs recorded in the SD card 80 may also be loaded and executed in the RAM 112.

Figure 3:
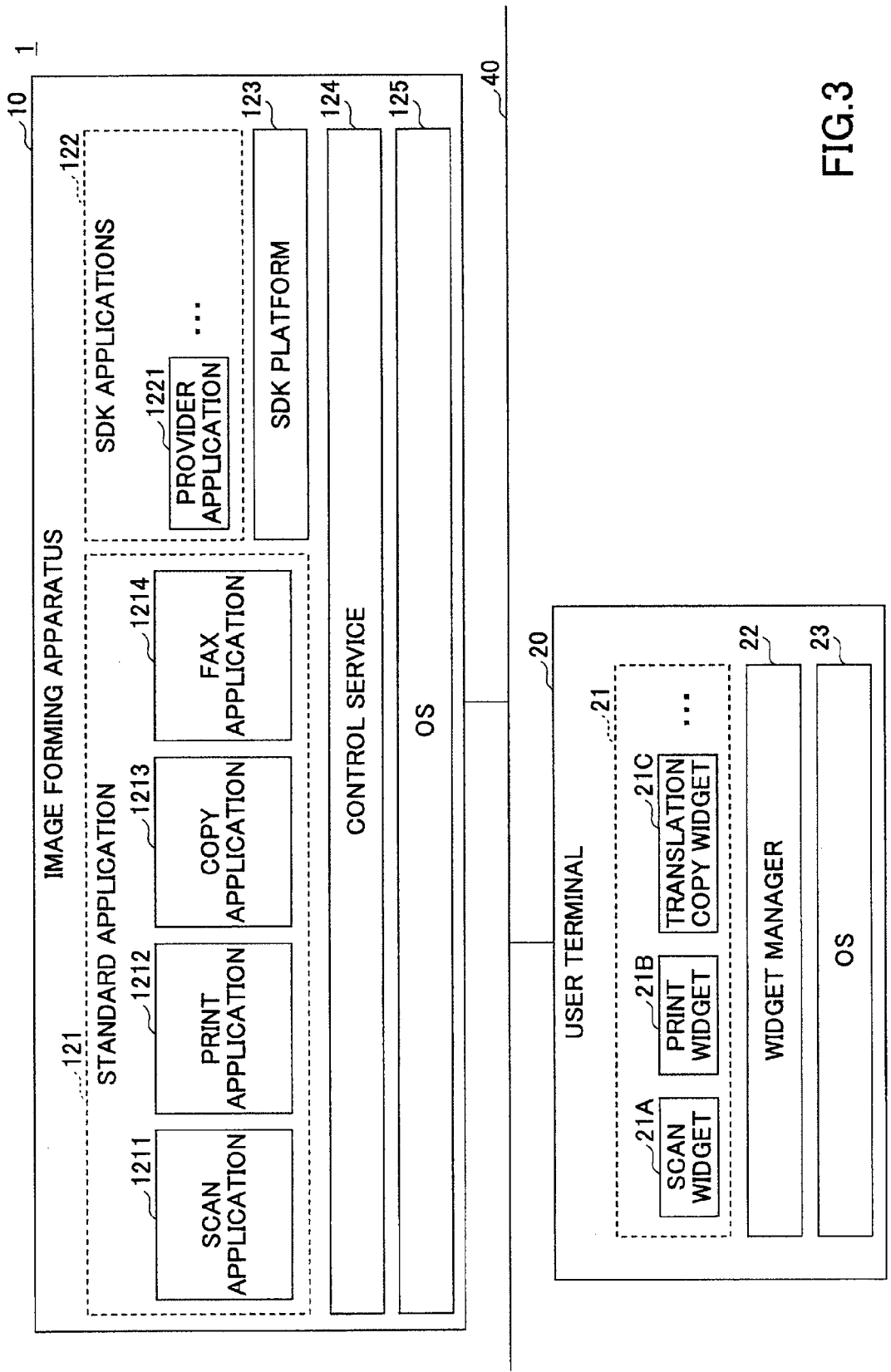
FIG. 3 illustrates a software configuration of the image forming apparatus and a user terminal according to an embodiment of the present invention.

FIG. 3 illustrates a software configuration of the image forming apparatus 10 and the user terminal 20 according to an embodiment of the present invention. As shown in FIG. 3, the user terminal 20 includes a scan widget 21A, a print widget 21B, a translation copy widget 21C, a widget manager 22, and an OS 23.

In the present embodiment, the scan widget 21A, the print widget 21B, and the translation copy widget 21C are application programs that may be collectively referred to as widgets 21. In recent years, simple and convenient applications referred to as widgets or gadgets have been available in the market. In the present embodiment, the widgets 21 generally refer to applications that can be easily and conveniently installed and used (thus, the technical scope is not limited by the term "widget"). In the present embodiment, the widgets 21 have a common characteristic in that they use services provided by the image forming apparatus 10 or services provided in the network 70 to control predetermined process flows.

The scan widget 21A causes the image forming apparatus 10 to execute a scanning process, and saves the image data obtained as a result of the scanning process in the user terminal 20.

The print widget 21B causes the image forming apparatus 10 to print out document data that is saved in the user terminal 20.

The translation copy widget 21C causes the image forming apparatus 10 to execute a scanning process, causes the OCR server 50 to execute an OCR process on the image data obtained as a result of the scanning process, causes the translation server 60 to execute a translation process on text data obtained as a result of the OCR process, and causes the image forming apparatus 10 to print out the text data that has undergone the translation process. That is to say, the translation copy widget 21C implements a process flow so that a Japanese document is output as a result of taking a copy of an English document.

The widget manager 22 is positioned as a framework of the widgets 21, and mediates communications between the widgets 21 and the image forming apparatus 10. Each of the widgets 21 are provided with an interface and a processing procedure specified by the widget manager 22. That is to say, the widgets 21 according the present embodiment are applications that operate in collaboration with the widget manager 22.

The OS 23 is a typical operating system. Software items in the user terminal 20 operate as processes or threads on the OS 23.

Meanwhile, the image forming apparatus 10 includes standard applications 121, an SDK application 122, an SDK platform 123, a control service 124, and an OS 125.

The standard applications 121 are an assembly of applications that are pre-installed in the image forming apparatus 10 as standard equipment (the image forming apparatus 10 is shipped with the standard applications 121). In FIG. 3, the examples of the standard applications 121 are a scan application 1211, a print application 1212, a copy application 1213, and a fax application 1214. The scan application 1211 executes a scan job. The print application 1212 executes a print job. The copy application 1213 executes a copy job. The fax application 1214 executes a fax transmission job or a fax reception job.

The control service 124 is a group of software modules for providing functions for controlling various hardware resources to upper applications. For example, the control service 124 has a function relevant to network communications, a function for controlling the scanner, a function for controlling the printer, and a function for managing memories.

The SDK applications 122 are additionally installed in the image forming apparatus 10 after shipment, as plug-ins for expanding functions of the image forming apparatus 10. In FIG. 3, a provider application 1221 is illustrated as an example of the SDK application 122. The provider application 1221 executes a process for making the widget 21 operable by the image forming apparatus 10, and a process for causing the image forming apparatus 10 to execute a process requested by the widget 21.

The SDK platform 123 provides an environment for executing the SDK applications 122. The SDK applications 122 are developed with the use of an API (Application Program Interface) provided by the SDK platform 123. For example, the SDK platform 123 provides the SDK applications 122 with an interface for using a scanning function, an interface for using a printing function, and an interface for using the copy function. The API of the SDK applications 122 is available to the public, and a third party vendor may develop the SDK application 122.

The OS 125 is a typical operating system. Software items in the image forming apparatus 10 operate as processes or threads on the OS 125.

Figure 4:
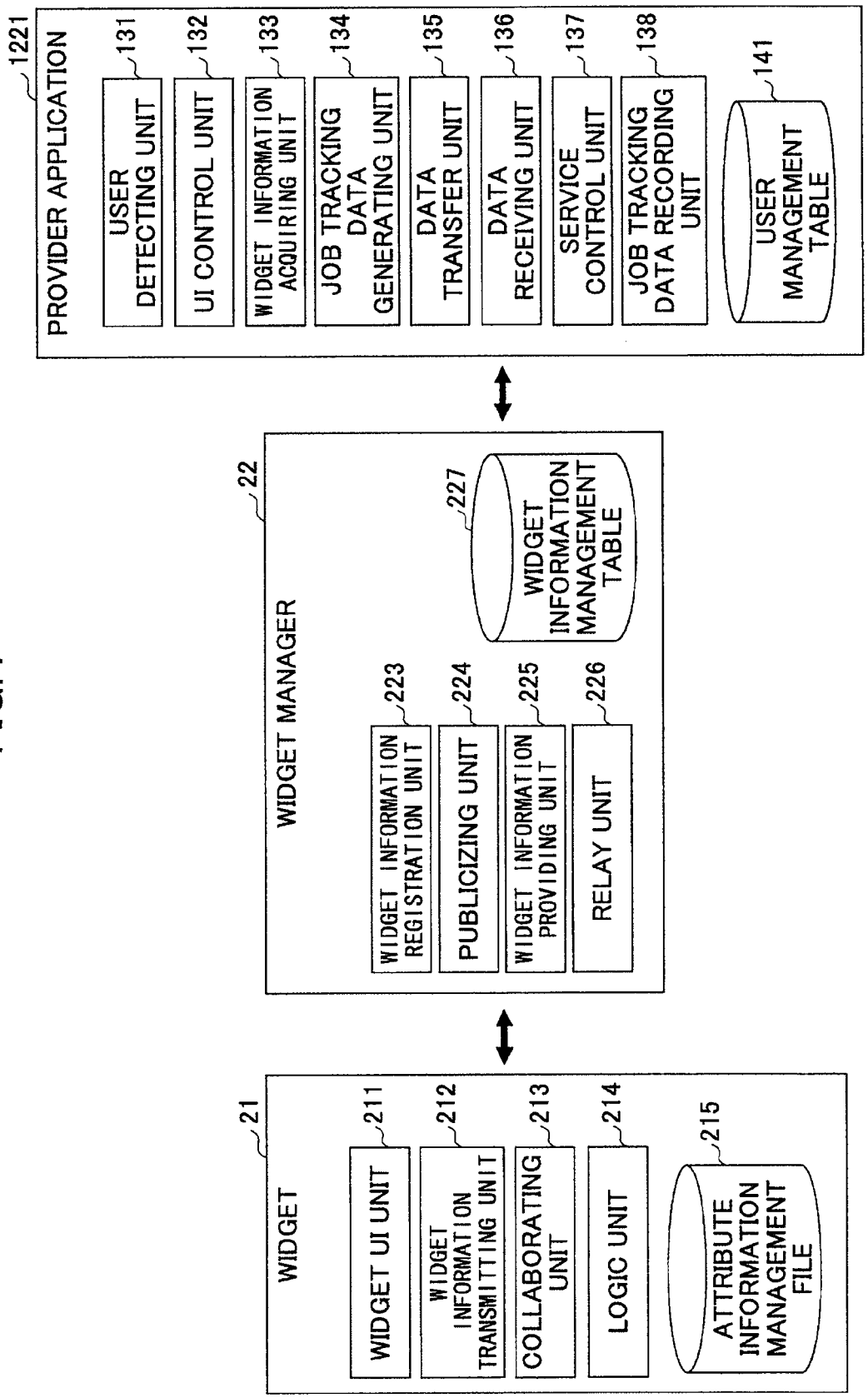
FIG. 4 illustrates a functional configuration of a widget, a widget manager, and a provider application according to a first embodiment of the present invention.

Next, a detailed description is given of the widget 21, the widget manager 22, and the provider application 1221. FIG. 4 illustrates a functional configuration of the widget 21, the widget manager 22, and the provider application 1221 according to a first embodiment of the present invention.

As shown in FIG. 4, each widget 21 includes a widget UI unit 211, a widget information transmitting unit 212, a collaborating unit 213, a logic unit 214, and an attribute information management file 215.

The widget UI unit 211 causes a display device of the user terminal 20 to display various screen pages relevant to the widget 21. The widget information transmitting unit 212 sends, to the widget manager 22, a request to register widget information, when the widget 21 is activated. The widget information includes information necessary for executing the widget 21 (for example, information relevant to a process flow). The collaborating unit 213 controls communications (exchange of information) between the widget 21 and the widget manager 22. The attribute information management file 215 is a file for storing setting information for the widget 21. The logic unit 214 is where a function unique to each widget 21 is installed.

The widget manager 22 includes a widget information registration unit 223, a publicizing unit 224, a widget information providing unit 225, a relay unit 226, and a widget information management table 227.

The widget information registration unit 223 receives a request to register widget information from the widget 21, and saves the widget information in the widget information management table 227. The widget information management table 227 includes widget information of the widgets 21 that are activated in the user terminal 20. The widget information management table 227 is generated in the storage device of the user terminal 20.

The publicizing unit 224 publicizes (broadcasts or multicasts), on the network, a user ID included in widget information received by the widget information registration unit 223. The publication is issued in units of users (in units of user IDs). Specifically, assuming that a publication relevant to a user A has been issued in response to the activation of a certain widget in the user terminal 20, when another subsequent widget 21 is activated in the same user terminal 20, a publication relevant to such widget information is not issued. In the present embodiment, as a matter of convenience, it is assumed that each user terminal 20 corresponds to one user. Therefore, it can be said that a publication issued by the publicizing unit 224 is information for reporting to the image forming apparatus 10 that there is a new user that can use one of the widgets 21. In another example, the publications may be issued in units of widget information items. In this case, plural publications may be redundantly issued for the same user; however, the image forming apparatus 10 may eliminate such redundancy.

The widget information providing unit 225 supplies (sends) widget information registered in the widget information management table 227 to the image forming apparatus 10, in response to a request from the image forming apparatus 10. The relay unit 226 relays communications between the widget 21 and the provider application 1221.

The provider application 1221 includes a user detecting unit 131, a UI control unit 132, a widget information acquiring unit 133, a job tracking data generating unit 134, a data transfer unit 135, a data receiving unit 136, a service control unit 137, a job tracking data recording unit 138, and a user management table 141.

The user detecting unit 131 detects the presence of a user who can use the widget 21 based on a publication issued by the widget manager 22, and registers, in the user management table 141, a user ID included in the publication. The user management table 141 is for managing a list of users that are activating the widgets 21 on the network.

The UI control unit 132 receives input of an instruction to operate the widget 21 from a user. The widget 21 is located in the user terminal 20, but the widget 21 may be operated from the operations panel 15 of the image forming apparatus 10. The widget information acquiring unit 133 acquires, from the widget manager 22, widget information of the widget 21 belonging to a user selected as an execution target among users registered in the user management table 141.

The job tracking data generating unit 134 generates job tracking data (hereinafter, also referred to as "JTD"). Job tracking data is for recording charging information (information indicating the amount of charged fee) and information indicating whether a process for providing a service has been performed, for each service (executed process) used in a process flow executed by the widget 21. That is to say, the job tracking data is an example of charging information recording data. Each job tracking data item flows through the executors of services (the applications that execute the services) included in the process flow, so that charging information is recorded in the job tracking data by the executors.

The data transfer unit 135 transfers data to the widget manager 22. The transferred data includes data that is output as a result of executing a service requested by the image forming apparatus 10 (a requested process) among services (processes) included in the process flow of the widget 21 that is the execution target, as well as the job tracking data.

The data receiving unit 136 receives data from the widget manager 22. The received data includes data that is output as a result of executing a service by an executor other than the image forming apparatus 10 (in the present embodiment, the OCR server 50 or the translation server 60 corresponds to such an executor), as well as job tracking data in which the charging information of the service is recorded.

The service control unit 137 controls the process of executing a service requested by the widget 21. The process for implementing a service is transferred to the standard application 121 and other SDK applications 122.

The job tracking data recording unit 138 records the job tracking data in a nonvolatile recording medium (for example, the HDD 114), after the process flow has ended.

Figure 5:
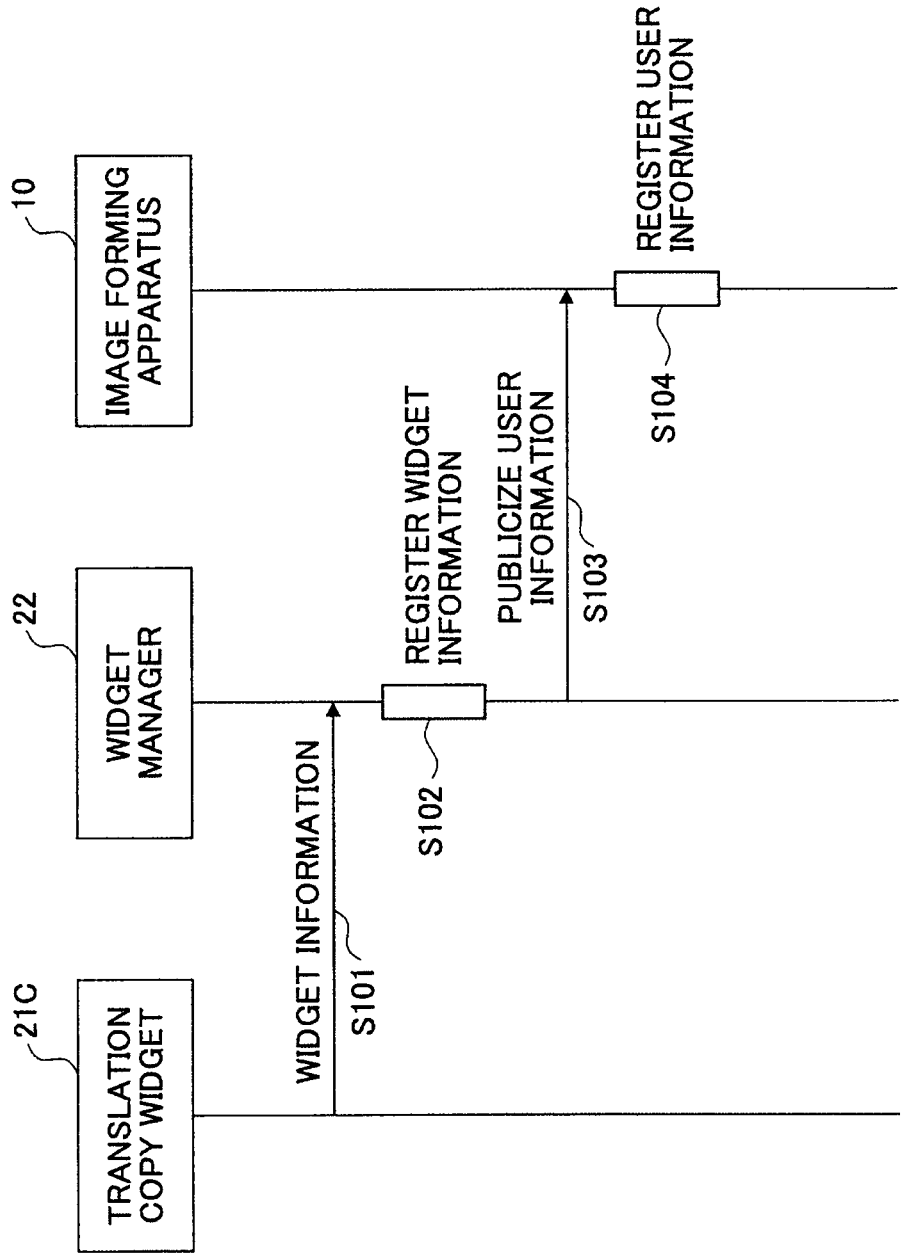
FIG. 5 is a sequence diagram for describing processing procedures performed when a widget is activated.

The following is a description of the processing procedures performed by the information processing system 1. FIG. 5 is a sequence diagram for describing processing procedures performed when a widget 21 is activated. At the initial stage in FIG. 5, it is assumed that the widget manager 22 has already been activated.

For example, when the translation copy widget 21C is activated in response to an instruction input by a user, the widget information transmitting unit 212 of the translation copy widget 21C acquires widget information from the attribute information management file 215 and sends the widget information to the widget information registration unit 223 of the widget manager 22 (step S101).

FIG. 6 illustrates an example of widget information of the translation copy widget 21C. As shown in FIG. 6, the widget information of the translation copy widget 21C includes a widget ID, a user ID, a widget address, a display name, and process flow information.

The widget ID is identification information for uniquely identifying each widget 21. The user ID is an identifier of a user of the translation copy widget 21C. That is to say, the widget 21 is associated with the user of the user terminal 20 in which the widget 21 is installed. The widget address is identification information (for example, a URL) for uniquely identifying each widget 21 in network communications. The display name is a character string for displaying the name of the translation copy widget 21C.

The process flow information includes a service name, a provider name, a URL, and setting information, for each service (executed process) used in a process flow executed by the translation copy widget 21C. The service name is an identification name of a service. In the present embodiment, the service name is written in English; however, the service name may be defined by codes that are easy to process by the program. The provider name is the company that is providing the service. For example, the provider name (ABC) of the scan service and the translation print service is the manufacturer of the image forming apparatus 10. The provider names of the OCR service and the translation service are the names of the operators of the OCR server 50 and the translation server 60. The URL is information used by the provider application 1221 of the image forming apparatus 10 to identify the services in the network. In the present embodiment, a URL is used as this information; however, instead of a URL, another type of identification information may be used according to the communications protocol being used. The setting information is execution conditions for each service. For example, in the case of a scan service, the setting information includes specifications about the resolution and color mode. In the case of an OCR service, the setting information includes specifications about the orientation of a document (vertical writing or horizontal writing) and the language. In the case of a translation service, the setting information includes specifications about the language of the text to be translated and the language into which the text is to be translated. In the case of a print service, the setting information includes specifications about the sheet size, the color mode, aggregate printing, and double-sided printing.

In the present embodiment, the order in which the services are arranged in the process flow information corresponds to the order in which the services are used (executed). That is to say, in the process flow of the translation copy widget 21C, the services are used (processes are executed) in the order of scan→OCR→translation→print. When the services may be arranged in the process flow information in an order that is unrelated to the usage order of services, information indicating the usage order of services may be included in the process flow information. The above description is given of widget information of the translation copy widget 21C. Other widgets 21 may also have widget information of the same configuration as that of the translation copy widget 21C.

The widget information is acquired from the attribute information management file 215. Therefore, a user may edit the attribute information management file 215 to customize the setting information of the respective services.

The widget information registration unit 223 registers the widget information in the widget information management table 227 corresponding to a user ID included in the received widget information (step S102). When there is no widget information management table 227 that corresponds to the user ID, the widget information registration unit 223 generates the widget information management table 227 corresponding to the user ID, and registers the widget information in the generated widget information management table 227. In the present embodiment, each user terminal 20 corresponds to one user. Furthermore, the widget information management table 227 is deleted when the widget manager 22 is ended. Therefore, in the present embodiment, when the widget 21 is activated for the first time after the user terminal 20 is activated, the widget information management table 227 is generated.

When a new widget information management table 227 is generated (that is to say, when widget information is registered for the first time for the user corresponding to the user ID included in the received widget information), the publicizing unit 224 issues, in the network, a publication including the user ID included in the received widget information and a URL (Uniform Resource Locator) for acquiring widget information (step S103). The URL for acquiring widget information (hereinafter, "widget information acquiring URL") is unique to each widget manager 22 (i.e., to each user terminal 20).

The publication is received by the user detecting unit 131 of the image forming apparatus 10 that is in a status for communicating with the user terminal 20. That is to say, the publication may be received by plural image forming apparatuses 10. In response to receiving a publication, the user detecting unit 131 of each image forming apparatus 10 registers, in the user management table 141, the user ID and the widget information acquiring a URL included in the publication (step S104).

FIG. 7 illustrates an example of the user management table 141. As shown in FIG. 7, in the user management table 141, the user ID and the widget information acquiring URL are managed in association with each other. In the example shown in FIG. 7, records are registered with respect to a user A and a user B.

As described above, the presence of the translation copy widget 21C is recognized by the widget manager 22. The presence of a user of the user terminal 20 is recognized by the image forming apparatus 10. Therefore, the user is able to use the translation copy widget 21C from the image forming apparatus 10. When the user continuously activates the scan widget 21A and the print widget 21B, the widget information of these widgets 21 are also registered in the widget information management table 227 of the widget manager 22. However, publications are not issued, because the publication relevant to the user has already been issued.

After the process of FIG. 5, the user moves to the location where the image forming apparatus 10 is installed to operate the translation copy widget 21C. When plural image forming apparatuses 10 are able to communicate with the user terminal 20, the user can select a desired image forming apparatus 10. That is to say, the user can operate the translation copy widget 21C by going to the desired image forming apparatus 10 among plural image forming apparatuses 10.

Figure 8:
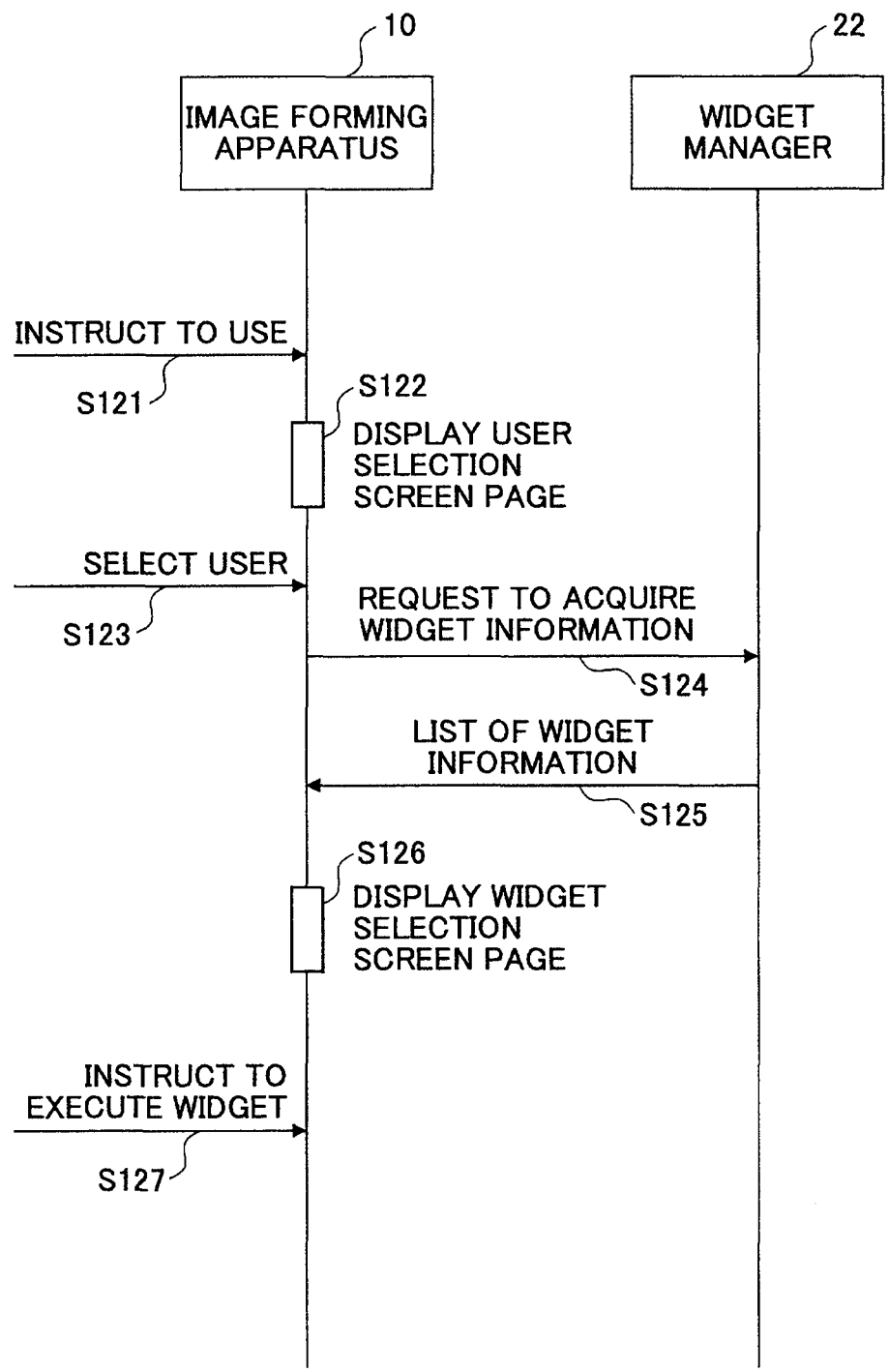
FIG. 8 is a sequence diagram for describing processing procedures of selecting a widget that is an execution target.

Next, a description is given of a process executed according to user operation of the image forming apparatus 10. FIG. 8 is a sequence diagram for describing processing procedures of selecting a widget that is an execution target.

When a user inputs an instruction for using the provider application 1221 via the operations panel 15 (step S121), the UI control unit 132 of the provider application 1221 causes the operations panel 15 to display a user selection screen page based on information registered in the user management table 141 (step S122). In step S122, the UI control unit 132 may acquire user information from the widget manager 22, and cause the operations panel 15 to display a user selection screen page based on the acquired user information. In this case, steps S103 and S104 of FIG. 5 do not need to be performed in advance.

Figure 9:
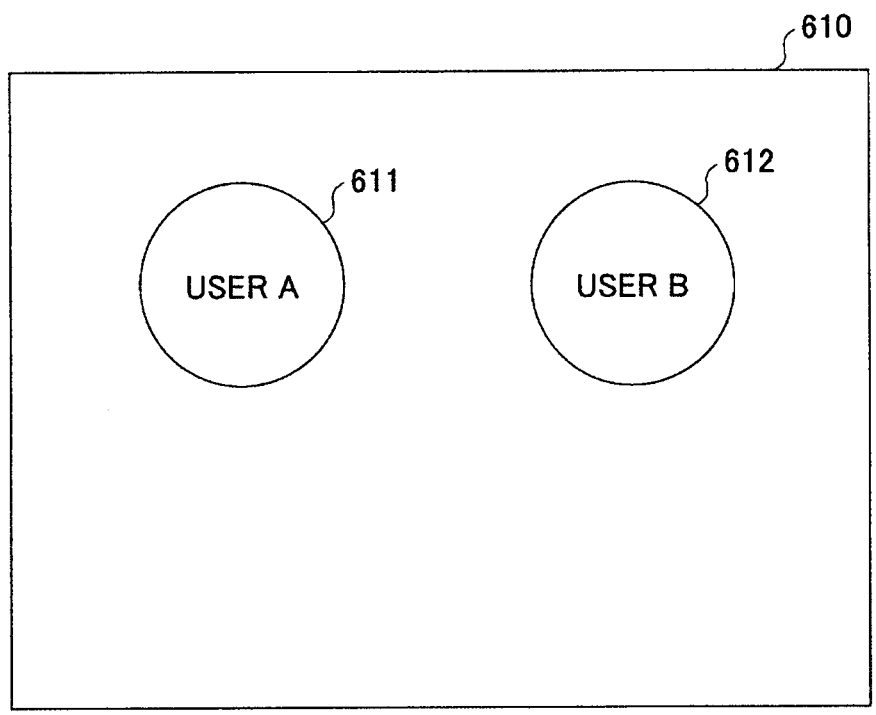
FIG. 9 illustrates an example of a displayed user selection screen page.

FIG. 9 illustrates an example of a displayed user selection screen page. A user selection screen page 610 shown in FIG. 9 includes buttons that each correspond to a user ID. In FIG. 9, a button 611 corresponding to a user A and a button 612 corresponding to a user B are displayed.

Next, the user presses a button corresponding to his or her own user ID in the user selection screen page 610 (step S123). As the button is pressed, the widget information acquiring unit 133 acquires, from the user management table 141, a widget information acquiring URL associated with the user ID corresponding to the selected button. The user may be authenticated as the button corresponding to the user ID is pressed, and subsequent processes may be executed only when the user is authenticated.

Next, the widget information acquiring unit 133 sends a request to acquire widget information to the widget information acquiring URL (step S124). The request to acquire widget information sent to the widget information acquiring URL is received by the widget information providing unit 225 of the widget manager 22. The widget information providing unit 225 acquires widget information of all of the widgets 21 registered in the widget information management table 227, and sends a list of the acquired widget information items to the provider application 1221 (step S125). When sending the list of widget information items, the widget information providing unit 225 generates a unique URL (hereinafter, "widget relay URL") for each widget 21 (each widget information item) to relay communications between the provider application 1221 and the widget 21. The widget information providing unit 225 attaches the widget relay URL generated for each widget 21, to the widget information corresponding to each widget 21, and sends, to the provider application 1221, a list of widget information items to which widget relay URLs have been attached. FIG. 10 illustrates an example of the widget information that is sent in step S125.

FIG. 10 illustrates an example of widget information of the of the translation copy widget 21C that is sent from the widget manager 22 to the provider application 1221.

The widget information shown in FIG. 10 is formed by attaching a widget relay URL to the widget information shown in FIG. 6. In step S125, a list of widget information items as shown in FIG. 10 is sent to the provider application 1221. The list of widget information items may include one or more widget information items.

The widget relay URL may be generated when the widget information is registered in the widget information management table 227 and attached to the widget information.

The UI control unit 132 of the provider application 1221 records the received list of widget information items in the RAM 112, and displays a screen page (widget selection screen page) including a list of widgets 21 that can be used by the user (step S126).

Figure 11:
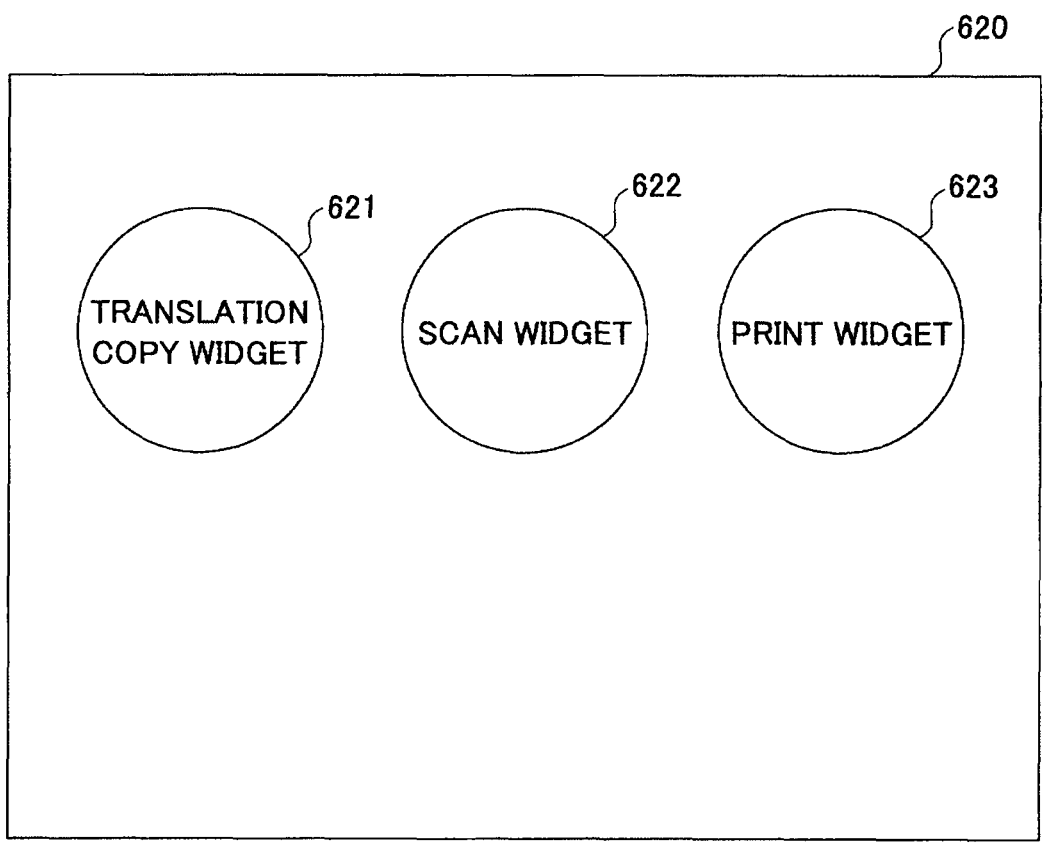
FIG. 11 illustrates an example of a displayed widget selection screen page.

FIG. 11 illustrates an example of a displayed widget selection screen page. A widget selection screen page 620 shown in FIG. 11 includes buttons that each correspond to a widget 21. In FIG. 11, a button 621 corresponding to the translation copy widget 21C, a button 622 corresponding to the scan widget 21A, and a button 623 corresponding to the print widget 21B are displayed.

When a user selects the button 621 corresponding to the translation copy widget 21C in the widget selection screen page 620, an original is set in the scanner 12, and the user presses the start key of the operations panel 15 (step S127), a process flow of the translation copy widget 21C starts.

Figure 12:
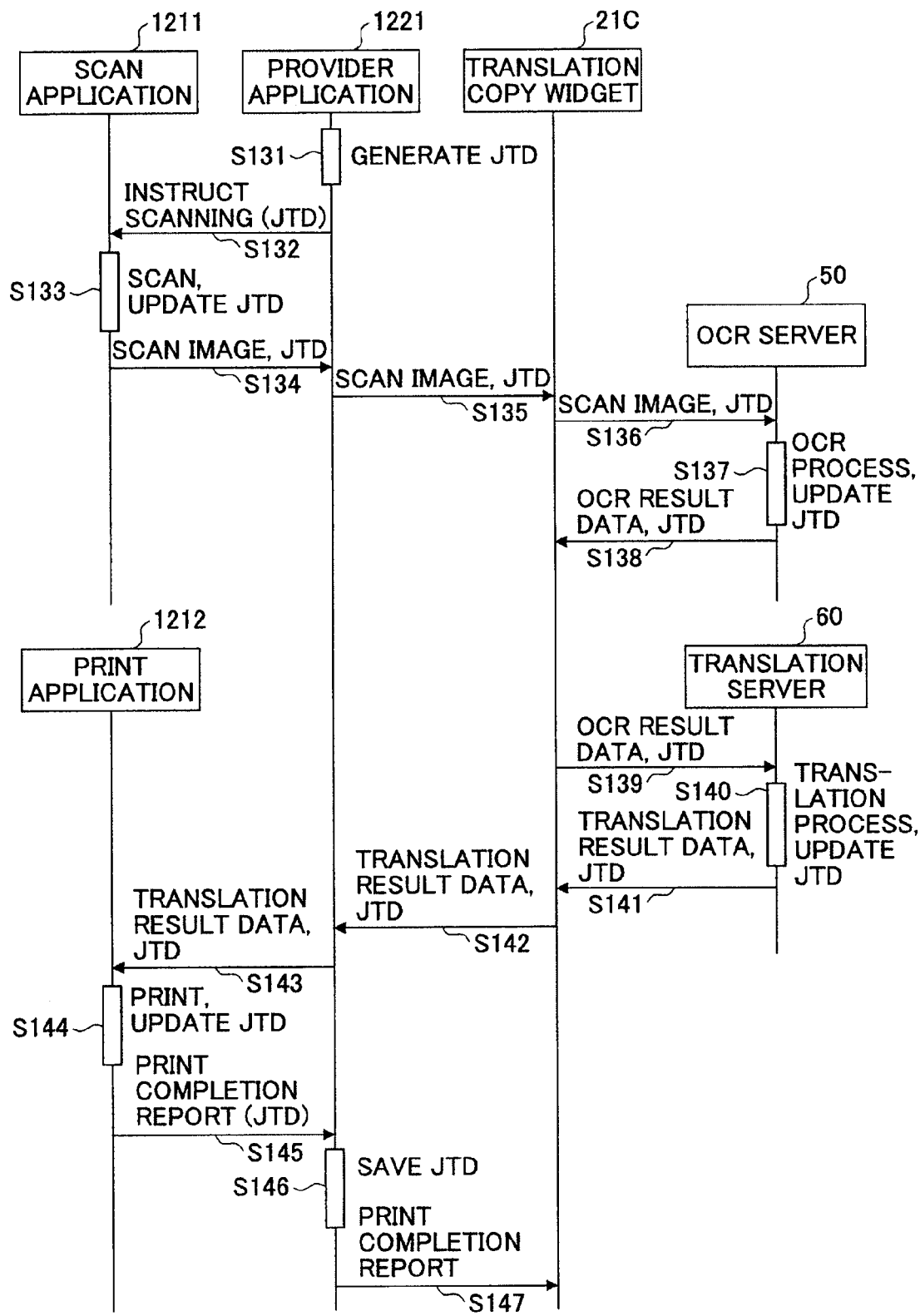
FIG. 12 is a sequence diagram for describing processing procedures performed when executing a process flow of the translation copy widget according to the first embodiment of the present invention.

Next, a description is given of processing procedures performed when executing a process flow of the translation copy widget 21C. FIG. 12 is a sequence diagram for describing processing procedures performed when executing a process flow of the translation copy widget 21C according to a first embodiment of the present invention.

When the translation copy widget 21C is selected as an execution target, the job tracking data generating unit 134 of the provider application 1221 generates job tracking data (JTD) in the RAM 112, based on widget information corresponding to the translation copy widget 21C (hereinafter, "current widget information") (step S131).

FIG. 13 illustrates an example of job tracking data. As shown in FIG. 13, the job tracking data is formed by attaching a job tracking ID to the process flow information of the current widget information. The job tracking ID is identification information of job tracking data. For example, the job tracking ID is a character string unique to each job tracking data item. The job tracking data generating unit 134 allocates and attaches (records) a job tracking ID to job tracking data, every time job tracking data is generated.

The job tracking data is configured such that a charging degree and an execution result may be recorded for each service in the process flow information. The charging degree is an index indicating the charging amount. The charged fee itself may be recorded as the charging degree. The execution result is information indicating whether a service has been executed. The data of FIG. 13 shows a state where a service has not yet been executed, and therefore values of the charging degree and the execution result are blank for all services.

The job tracking data generating unit 134 records, in the RAM 112, information for associating the current widget information with the generated job tracking data (association information). For example, a pair of IDs including a widget ID of the current widget information and a job tracking ID is recorded in the RAM 112 as association information.

The service control unit 137 of the provider application 1221 determines that the provider application 1221 is to execute a scan service, based on a service name "scan" and a blank URL field in a first entry (see FIG. 10) in the process flow information included in the job tracking data generated by the job tracking data generating unit 134. That is to say, as the URL field is blank, the service control unit 137 determines that the service is to be executed in the image forming apparatus 10. The provider application 1221 is for executing the scan service in the image forming apparatus 10, and therefore the service control unit 137 determines that the executor of the scan service is the provider application 1221.

The service control unit 137 specifies job tracking data, and inputs an instruction to execute scanning in the scan application 1211 (step S132). The scan application 1211 causes the scanner 12 to scan one original according to setting information of the scan service included in the job tracking data, and records the charging degree and the execution result of scanning for one scanning operation in the job tracking data (step S133). Next, the scan application 1211 outputs, to the service control unit 137, image data (scan image) obtained by scanning an original, and job tracking data in which the charging degree and the execution result of the scan service are recorded (step S134).

Next, the service control unit 137 determines that an OCR service is to be executed by an external Web service, based on a service name "OCR" and a URL in a second entry in the process flow information. According to the determination, the data transfer unit 135 of the provider application 1221 sends, to a widget relay URL included in the current widget information, a scan completion report including the scan image and job tracking data (step S135). The scan completion report sent to the widget relay URL is received by the relay unit 226 of the widget manager 22. The relay unit 226 acquires widget information corresponding to the widget relay URL from the widget information management table 227, and transfers the scan completion report to a widget address included in the widget information. The scan completion report sent to the widget address is received by the logic unit 214 of the translation copy widget 21C.

As described above, the data is transferred from the data transfer unit 135 to the translation copy widget 21C via the widget manager 22. However, the mediation process performed by the widget manager 22 is not shown in the sequence diagram as a matter of convenience. Furthermore, descriptions relevant to the mediation process performed by the widget manager 22 are omitted in the following.

Next, in response to receiving the scan completion report, the logic unit 214 of the translation copy widget 21C sends, to the OCR server 50, a request to execute an OCR process on the scan image (step S136). The execution request includes the scan image and job tracking data included in the scan completion report. The logic unit 214 of the translation copy widget 21C is aware of the process flow executed by the translation copy widget 21C, the services used in the process flow, and the location (e.g., URL) of the provider of the services. This information may be incorporated (hard-coded)

as logic in the logic unit 214, or may be dynamically acquired based on the attribute information management file 215 of the translation copy widget 21C.

Next, the OCR server 50 executes an OCR process on the scan image, and records the charging degree and execution result of the OCR process (step S137). Next, the OCR server 50 returns an OCR completion report to the translation copy widget 21C. The OCR completion report includes text data (data that undergone OCR, hereinafter, "OCR result data") and job tracking data obtained as a result of the OCR process (steps S138).

In response to the OCR completion report, the logic unit 214 of the translation copy widget 21C sends, to the translation server 60, a request to execute a translation process on the OCR result data (step S139). The execution request includes the OCR result data and job tracking data.

Next, the translation server 60 executes a translation process on the OCR result data, and records the charging degree and the execution result of the translation process in the job tracking data (step S140). Next, the translation server 60 returns a translation completion report to the translation copy widget 21C. The translation completion report includes text data obtained as a result of the translation process (translation result data) and job tracking data (step S141).

In response to the translation completion report, the logic unit 214 of the translation copy widget 21C sends, to the provider application 1221 of the image forming apparatus 10, a request to execute a printing process on the translation result data (step S142). The execution request includes the translation result data and job tracking data. The process execution request that is sent from the translation copy widget 21C to the provider application 1221 is transferred via the relay unit 226 of the widget manager 22. The relay process performed by the widget manager 22 is not described in the following or illustrated in the sequence diagram, as a matter of convenience.

When a request to execute a printing process is received, the data receiving unit 136 of the provider application 1221 reports the execution request to the service control unit 137. The service control unit 137 specifies the translation result data and job tracking data included in the execution request, and inputs an instruction to execute printing in the print application 1212 (step S143). The print application 1212 causes the printer 13 to print out the translation result data according to the setting information for the print service included in the job tracking data, and records, in the job tracking data, the charging degree and the execution result of the process of printing one page (step S144). Next, the print application 1212 outputs, to the service control unit 137, the job tracking data in which the charging degree and the execution result of the process of printing one page are recorded, and reports to the service control unit 137 that printing has ended (step S145).

The service control unit 137 determines that the process flow of the translation copy widget 21C has ended based on the charging degree or the execution result recorded in the job tracking data. When the process flow has ended, the job tracking data recording unit 138 of the provider application 1221 determines whether the execution results are successful (normally ended) for all of the services included in the process flow. When the execution results are successful (normally ended) for all of the services, the job tracking data recording unit 138 records (saves) the job tracking data in a nonvolatile recording medium (for example, HDD 114) (step S146).

FIG. 14 illustrates an example of job tracking data in which charging degrees and execution results are recorded. In the job tracking data shown in FIG. 14, charging degrees "1", "2", "5", and "1" are recorded for a scan service, an OCR service, a translation service, and a print service, respectively. "OK", which indicates successful, is recorded as the execution results for all of the services.

Next, the data transfer unit 135 sends a print process completion report to the translation copy widget 21C (step S147). In response to the print process completion report, the logic unit 214 of the translation copy widget 21C ends the execution of the process flow.

The job tracking data recorded in the HDD 114 is used as charging information for charging fees to the user. The charging degrees of all services used by the translation copy widget 21C are recorded in the job tracking data and managed in an integrated manner by the image forming apparatus 10. Therefore, the fees can be charged to the user of the translation copy widget 21C at once, based on the job tracking data. For example, a serviceman of the manufacturer of the image forming apparatus 10 refers to the job tracking data, and charges the fees to the user at once. Therefore, the user only needs to pay the amount charged by a single charging source. Accordingly, the user is saved from having to pay the fees charged from different service providers.

The manufacturer of the image forming apparatus 10, who has collected the fees at once, distributes the collected fees to other service providers (the operator of the OCR server 50 and the operator of the translation server 60, etc.) depending on the charging degree recorded in the job tracking data. The manufacturer of the image forming apparatus 10 and the other service providers may enter into an agreement in advance, as to how the charged fees are handled.

When the original document includes plural pages, the simplest sequence is to repeat (loop) the steps S131 through S147 for a number of times corresponding to the number of pages (case 1). However, it is possible to loop only some of the steps, by having the translation copy widget 21C retain the data corresponding to plural pages. Specifically, the translation copy widget 21C may repeat steps S131 through S135 for all of the pages, and wait until the scan images of all of the pages are received (case 2). In this case, the translation copy widget 21C sends the scan images of all pages to the OCR server 50 at once in step S136. Therefore, in the processes subsequent to step S136 (print, etc.), the data for all pages is the target of each process.

The translation copy widget 21C may execute steps S131 through S141 for all of the pages, and may wait until the translation result data of all pages is received (case 3). In this case, the translation copy widget 21C sends the translation result data of all pages to the provider application 1221 at once in step S142. Therefore, in the processes (OCR, translation, and print) subsequent to step S142, the data for all pages is the target of one process.

Figure 15:
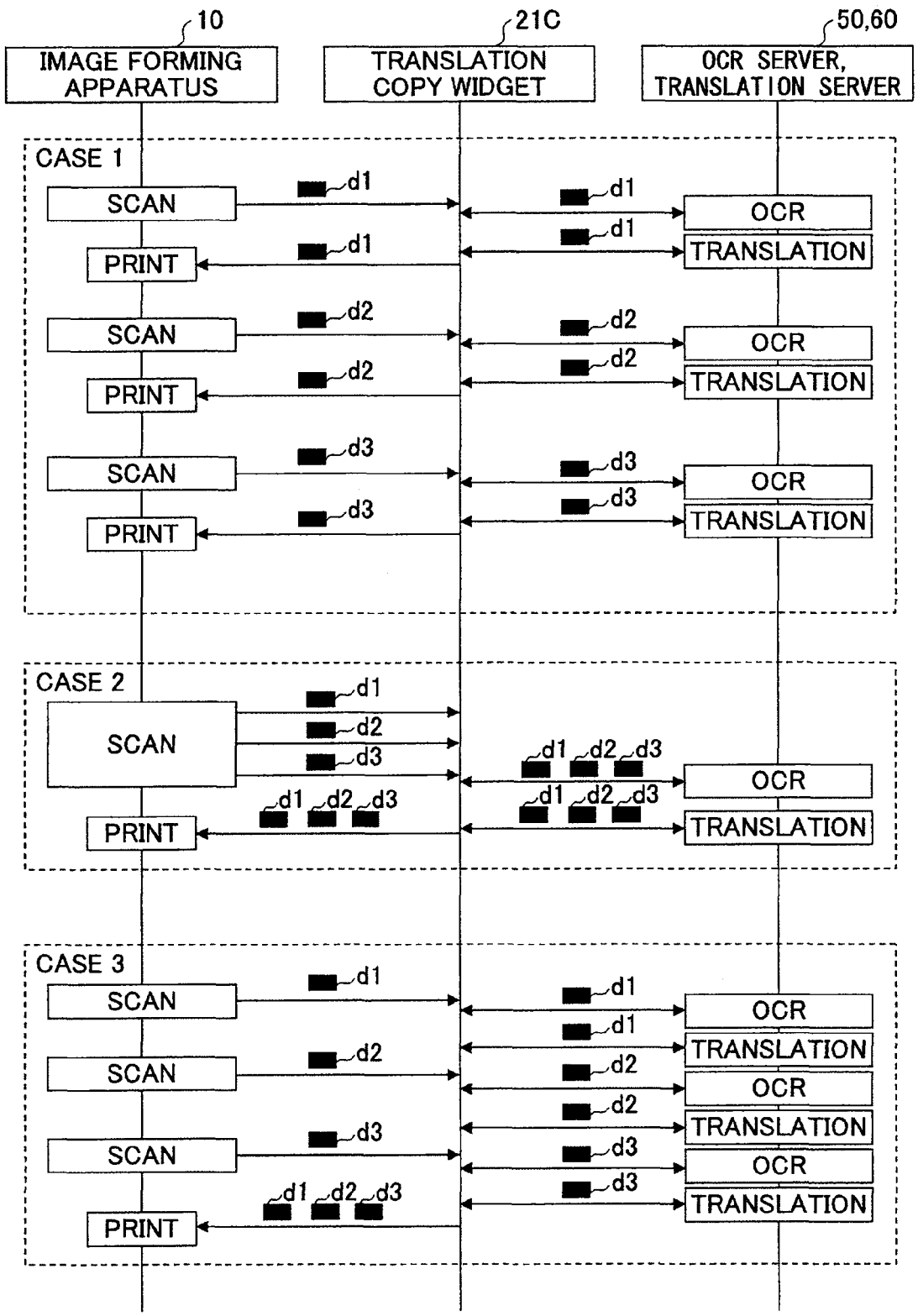
FIG. 15 illustrates variations in controlling the process flow performed by the translation copy widget.

A summary of cases 1 through 3 is illustrated in FIG. 15. FIG. 15 illustrates variations in controlling the process flow performed by the translation copy widget 21C. As shown in FIG. 15, the OCR server 50 and the translation server 60 are indicated on the same axis as a matter of convenience. Furthermore, d1 through d3 denote job tracking data. The job tracking data items of the same subjects in the respective cases are denoted by the same reference numerals.

For example, assuming that the original document includes three pages, in case 1, the process flow of scanning→OCR→translation→printing is repeated (looped) three times. In this case, the charging degree and the execution result are recorded in the job tracking data d1 in the first process flow, the charging degree and the execution result are recorded in the job tracking data d2 in the second process flow, and the charging degree and the execution result are recorded in the job tracking data d3 in the third process flow. The job tracking data d2 and d3 may be generated by copying the job tracking data d1 (but excluding the charging degree and the execution result of d1), every time the scan application 1211 executes scanning for one page. Furthermore, every time the scan application 1211 executes scanning for one page, the provider application 1221 may be requested to generate new job tracking data, and in response to such a request, the job tracking data generating unit 134 of the provider application 1221 may generate job tracking data d2 and d3 as new job tracking data. This is also applicable to cases 2 and 3.

In case 2, three pages are continuously scanned, OCR and translation are executed on the scan images corresponding to three pages, and printing is executed for translation result data corresponding to three pages. In this case, job tracking data d1 through d3 corresponding to three pages is transferred at once at the time of an execution request and a response of an OCR process, an execution request and a response of a translation process, and an execution request of a printing process. Thus, the OCR server 50, the translation server 60, and the print application 1212 record the charging degree and the execution result corresponding to each page, in the job tracking data d1 through d3. In case 3, the process flow of scan→OCR→translation is repeated three times, and translation result data corresponding to three pages is retained in the translation copy widget 21C. Subsequently, printing is performed for translation result data corresponding to three pages. In this case, the job tracking data d1 through d3 corresponding to three pages is transferred at once at the time of the execution request for the printing process. Accordingly, the print application 1212 records the charging degree and the execution result corresponding to each page, in the job tracking data d1 through d3.

In all of the cases 1 through 3, all three sets of job tracking data d1 through d3 are recorded (stored) in the HDD 114.

Figure 16:
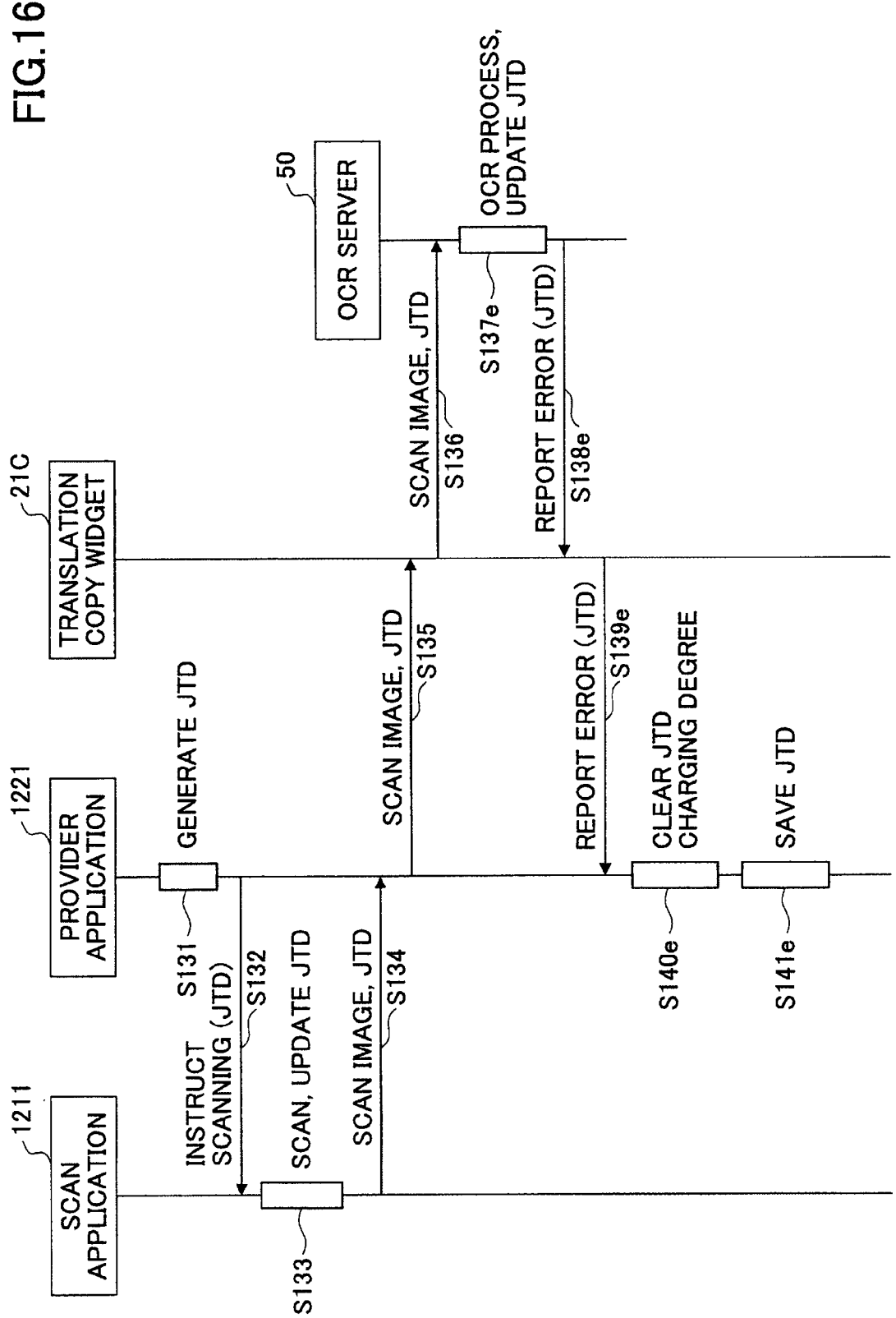
FIG. 16 is a sequence diagram for describing processing procedures performed when an error occurs during a process flow of the translation copy widget according to the first embodiment of the present invention.

Next, a description is given of a case where an error occurs during the process flow. FIG. 16 is a sequence diagram for describing processing procedures performed when an error occurs during a process flow of the translation copy widget 21C according to the first embodiment of the present invention. In FIG. 16, steps corresponding to those in FIG. 12 are denoted by the same step numbers and are not further described.

FIG. 16 illustrates an example where an error occurs during the OCR process (step S137e) performed by the OCR server 50. In this case, the OCR server 50 records that the OCR process has been unsuccessful in the job tracking data.

FIG. 17 illustrates an example of job tracking data when an error has occurred. In FIG. 17, NG, indicating that an error has occurred, is recorded in the job tracking data as an execution result of the OCR service. In FIG. 17, the charging degree of the OCR service is not recorded; however, zero may be recorded as the charging degree.

Next, the OCR server 50 returns an error report message and the job tracking data to the translation copy widget 21C (step S138e). When the error report message is received, the logic unit 214 of the translation copy widget 21C cancels further processes, and transfers the job tracking data to the provider application 1221 (step S139e). When the job tracking data recording unit 138 of the provider application 1221 detects that there is a service (in this case, an OCR service) whose execution result is indicating "NG" as the execution result based on the job tracking data, the job tracking data recording unit 138 nullifies the charging degree that has already been recorded in the job tracking data (step S140e).

For example, the value of the recorded charging degree is changed to "0" or deleted (cleared), so that no fees are charged. Next, the job tracking data recording unit 138 records the job tracking data including the nullified charging degree in a nonvolatile recording medium (for example, the HDD 114) (step S141e).

FIG. 18 illustrates an example of job tracking data including the nullified charging degree. FIG. 18 illustrates an example in which the charging degree of a scan service has been changed from "1" to "0".

The charging degree is nullified when an error occurs during the process flow, and therefore, it is possible to prevent a fee from being charged for a service (in this case, a scan service) that has been successfully processed, even though the final product (in this case, a printed document in Japanese) is not achieved.

With reference to FIG. 15, a description is given of the charging range (charging target) when an error occurs during processing of the second page onward when the original document includes plural pages.

In case 1, for example, when an error occurs at the second page, all charging degrees in the job tracking data d2 are nullified. However, the charging degrees in the job tracking data d1 have already been fixed, and therefore the fixed charging degrees cannot be nullified. Accordingly, a fee is charged for the first page. Similarly, even if an error occurs at the third page, fees are charged for the first two pages. That is to say, fees are charged in units of pages, and are only charged for pages for which the process flow has been completed.

The rule of charging fees only for pages for which the process flow has been completed is also applicable to cases 2 and 3. However, the data units (number of pages) set as the target for one process in the service may vary according to each case. Therefore, the timing of determining the charging degree in the job tracking data may vary according the difference such data units.

That is to say, in case 2, when an error occurs in the scan process, the OCR process, or the translation process in the first to third pages, not all of the services in the process flow will indicate an execution result "OK" in the job tracking data d1 through d3. For example, when an error occurs during an OCR process at the second page, the execution results of the OCR service in the job tracking data d1, d2, and d3 will indicate "OK", "NG", and "NG". Even when the OCR process is successful for the first page, if three pages are set as one unit, the OCR process is determined as being unsuccessful, and therefore the process flow is canceled. As a result, the execution result of the print service is not recorded as "OK", even in the job tracking data d1. Therefore, all charging degrees are nullified in the job tracking data d1 through d3; the charging degrees are nullified in the job tracking data d2 and d3 in which "NG" is recorded as execution results of the OCR service, and the charging degrees are also nullified in the job tracking data d1 in which the execution result of the print service is not recorded. Accordingly, no fees are charged for any of the pages. However, when an error occurs during a printing process of the second page, the charging degrees in the job tracking data d1 have already been fixed, and therefore a fee is charged for one page. Similarly, when an error occurs during a printing process of the third page, a fee is charged for the first two pages. The same applies to case 3.

Figure 19:
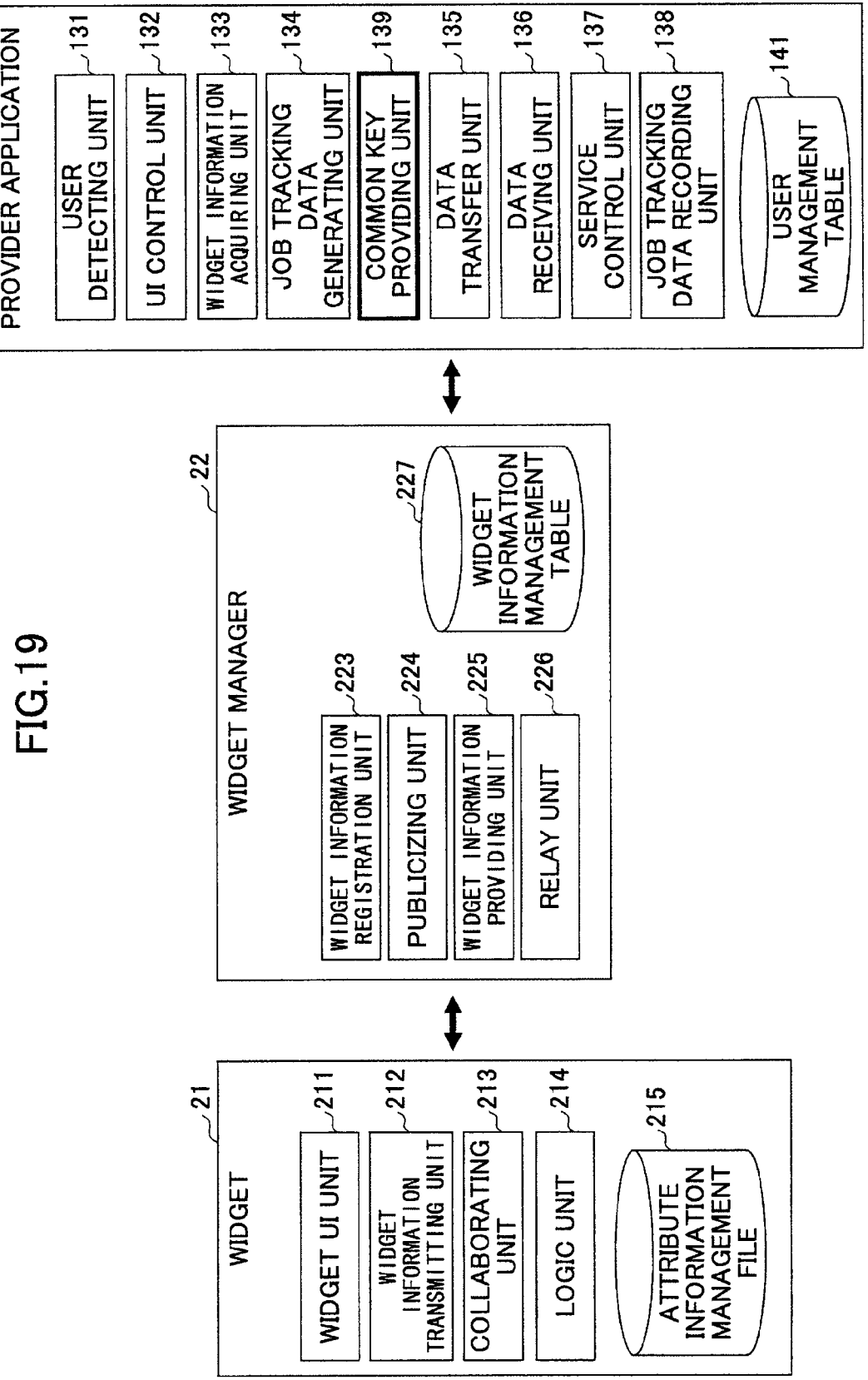
FIG. 19 illustrates a functional configuration of the widget, the widget manager, and the provider application according to a second embodiment of the present invention.

Next, a description is given of a second embodiment of the present invention. FIG. 19 illustrates a functional configuration of the widget 21, the widget manager 22, and the provider application 1221 according to the second embodiment of the present invention. In FIG. 19, elements corresponding to those in FIG. 4 are denoted by the same reference numerals, and are not further described.

In FIG. 19, the provider application 1221 further includes a common key providing unit 139. The common key providing unit 139 generates an encryption key (common key) for encrypting data that is generated as a result of executing a service and job tracking data. Furthermore, the common key providing unit 139 safely transfers the generated common key to the OCR server 50 and the translation server 60.

A description is given of processing procedures of the information processing system 1 according to the second embodiment. In the second embodiment, only the different points from the first embodiment are described. Therefore, the points that are not particularly described may be the same as the first embodiment.

FIGS. 20A and 20B illustrate a sequence diagram for describing processing procedures performed when executing a process flow of the translation copy widget 21C according to the second embodiment. In the second embodiment, the process of FIGS. 20A and 20B is performed instead of the process of FIG. 12.

In step S201, the job tracking data generating unit 134 of the provider application 1221 generates job tracking data (JTD) in the ram 112, similar to step S131 of FIG. 12. Next, the common key providing unit 139 of the provider application 1221 generates an encryption key (hereinafter, "common key A") for encrypting the data that flows through the network, and associates the common key A with a job tracking ID (step S202). The generation logic of the common key A is not limited to a particular logic. For example, the common key A may be a random number that is generated with a random number generator.

Next, the common key providing unit 139 requests the OCR server 50 and the translation server 60 to submit an electronic certificate, based on the respective URLs included in the job tracking data (steps S203 and S209). The electronic certificate is a digital certificate that is issued by a so-called certificate authority (CA). When electronic certificates are returned by the OCR server 50 and the translation server 60 (steps S204 and S210), the common key providing unit 139 confirms the credibility of the returned electronic certificates (steps S205 and S211). The method of confirming the credibility of an electronic certificate may be in accordance with the conventional technology. When the credibility of the electronic certificates is confirmed, the common key providing unit 139 encrypts the common key A with public keys included in the electronic certificates (steps S206 and S212). Next, the common key providing unit 139 sends the encrypted common key A to the OCR server 50 and the translation server 60 together with the job tracking ID (JTID) of the job tracking data (steps S207 and S213). In FIGS. 20A and 20B, if the data is in brackets < >, it means that the data has been encrypted. For example, <common key> in steps S207 and S213 indicates that the common key A is encrypted.

The OCR server 50 and the translation server 60 decrypt the encrypted common key A with respective secret keys, and save the decrypted common key A in association with a job tracking ID received together with the common key A (steps S208 and S214).

According to the above process, the common key A is safely shared by the image forming apparatus 10, the OCR server 50, and the translation server 60.

Next, the service control unit 137 of the provider application 1221 specifies job tracking data in a similar manner as that of step S132 (FIG. 12), and inputs an instruction to execute scanning in the scan application 1211 (step S221).

The scan application 1211 causes the scanner 12 to execute scanning in the same manner as step S133 (FIG. 12), and records the charging degree and the execution result of scanning in the job tracking data (step S222). Next, the scan application 1211 outputs, to the service control unit 137, the image data obtained by scanning (scan image) and the job tracking data (step S223).

Next, the data transfer unit 135 encrypts the scan image and the job tracking data with the common key A (step S224). Next, the data transfer unit 135 sends, to the translation copy widget 21C, a scan completion report including the encrypted scan image and the job tracking data (step S225). In FIGS. 20A and 20B, if the data is in brackets < >, it means that the data has been encrypted. For example, <scan image, JTD> in step S225 indicates that the scan image and the job tracking data are encrypted.

In the scan completion report, the job tracking ID in plain text is in a format that can be confirmed. For example, when the job tracking data is encrypted in step S224, the job tracking ID may be excluded from the data subjected to encryption. Alternatively, a job tracking ID in plain text may be sent together with the entirely encrypted job tracking data and scan image.

When the scan completion report is received, the logic unit 214 of the translation copy widget 21C sends a request to execute an OCR process to the OCR server 50. The execution request includes the encrypted scan image and job tracking data included in the scan completion report (step S226). The execution request also includes the job tracking ID in plain text.

The OCR server 50 specifies a common key A for decrypting the received data based on the received job tracking ID in plain text, and then uses the common key A to decrypt the scan image and the job tracking data (step S227). In this manner, the job tracking ID in plain text is used for specifying (identifying) a common key corresponding the request source (client), among plural common keys. There may be plural common keys because the widget 21 may be simultaneously used in plural image forming apparatuses 10.

Next, the OCR server 50 executes an OCR process on the decrypted scan image, and records the charging degree and the execution result of the OCR process in the job tracking data (step S228). Next, the OCR server 50 encrypts the OCR result data and job tracking data with the common key A (step S229). Next, the OCR server 50 returns an OCR completion report including the encrypted OCR result data and job tracking data, to the translation copy widget 21C (step S230). In the OCR completion report, the job tracking ID in plain text can be confirmed.

When the OCR completion report is received, the logic unit 214 of the translation copy widget 21C sends, to the translation server 60, a request to execute a translation process on the OCR result data (step S231). The execution request includes the encrypted OCR result data and job tracking data. The execution request also includes the job tracking ID in plain text.

Next, the translation server 60 specifies the common key A for decrypting the received data based on the received job tracking ID in plain text, and uses the common key A to decrypt the OCR result data and job tracking data (step S232). Next, the translation server 60 executes a translation process on the decrypted OCR result data, and records the charging degree and execution result of the translation process in the decrypted job tracking data (step S233). Next, the translation server 60 uses the common key A to encrypt the translation result data and job tracking data (step S234). Next, the translation server 60 returns, to the translation copy widget 210, a translation completion report including the encrypted translation result data and job tracking data (step S235). In the translation completion report, the job tracking ID in plain text can be confirmed.

When the translation completion report is received, the logic unit 214 of the translation copy widget 21C sends, to the provider application 1221 of the image forming apparatus 10, a request to execute a printing process on the translation result data (step S236). The execution request includes the encrypted translation result data and job tracking data. The execution request also includes the job tracking ID in plain text.

When the request to execute a printing process is received, the data receiving unit 136 of the provider application 1221 specifies the common key A to be used for decryption based on the job tracking ID in plain text, and uses the common key A to decrypt the encrypted translation result data and job tracking data (step S237). The data receiving unit 136 inputs a request to execute a printing process in the service control unit 137. The request includes the decrypted translation result data and job tracking data.

The subsequent steps S238 through S242 are the same as step S143 through S147 of FIG. 12. However, in step S242, the data transfer unit 135 sends, to the data transfer unit 135, a print completion report together with the common key A, as an encryption key transfer unit. Accordingly, the translation copy widget 21C can use the common key A to decrypt intermediate data such as a scan image, the OCR result data, and translation result data, when such intermediate data is saved at the translation copy widget 21C. The data transfer unit 135 transfers the common key A only when the execution results are indicating "OK" for all services in the job tracking data. That is to say, the common key A is transferred only when the charging degrees and the job tracking data are recorded for all services, and conditions for charging fees are fulfilled. Accordingly, it is possible to prevent the intermediate data from being decrypted and the services from being provided free of charge, when conditions for charging fees are not fulfilled.

The provider application 1221 may acquire an electronic certificate from the translation copy widget 21C, and transfer the common key A to the translation copy widget 21C only when the credibility of the electronic certificate is confirmed. In this case, by encrypting the common key A with a public key included in the electronic certificate, the common key A may be safely transferred. The common key A may be transferred to the widget manager 22, which is advantageous in that the widget manager 22 has higher credibility than the widget 21. The widget manager 22 uses the received common key A to decrypt the intermediate data, which has been recorded in a predetermined folder by the translation copy widget 21C.

According to the second embodiment, the job tracking data flows through the network in an encrypted form. Therefore, the job tracking data can be processed or edited only at the executor of the service (i.e., the application that executes a service for which a fee is charged). That is to say, the requestor of the service (e.g., the translation copy widget 21C) cannot refer to the contents of the job tracking data. Thus, it is possible to prevent fraudulent usage of a service by a widget 21 that has been developed by a malicious developer (hereinafter, a "fraudulent widget"). In the present embodiment, the process flow is controlled by the widget 21, and therefore the job tracking data needs to flow through the widget 21 as the process flow proceeds. Thus, a fraudulent widget may tamper the job tracking data. However, in the second embodiment, the job tracking data is encrypted, and therefore fraudulent tampering can be appropriately prevented. Examples of tampering the job tracking data are nullifying the charging degree and changing the execution result to "NG". In the first embodiment, if the charging degree is nullified, the service is provided free of charge to the fraudulent widget. In the first embodiment, if the execution result is changed to "NG", at least a part of the service is provided free of charge to the fraudulent widget. This is because when "NG" is recorded as the execution result, the job tracking data recording unit 138 of the provider application 1221 nullifies the charging degree in the job tracking data, but a part of the intermediate data may be retained in the user terminal 20.

According to the second embodiment, the common key is provided to the widget 21 after a status for charging has been established (i.e., in exchange for job tracking data). Therefore, even when the final product of the process flow of a widget 21 is not output by the image forming apparatus 10, the widget 21 is forced to transfer (return) the job tracking data to the image forming apparatus 10. More specifically, it is assumed that a widget 21 is created including services of "scan→OCR→translation" (hereinafter, "scan translation widget"). The final product of the scan translation widget is translation result data. Therefore, in the case of the first embodiment, the scan translation widget can obtain the final product at step S141 (see FIG. 12). That is to say, the scan translation widget can obtain the final product without transferring (returning) the job tracking data, which is received together with the translation result data at step S141, to the provider application 1221. Hence, it is up to the conscience of the developer of the scan translation widget whether the job tracking data is returned to the provider application 1221 by the scan translation widget. If the job tracking data is not returned, the charging degree is not recorded in the image forming apparatus 10, and therefore, the service provider cannot charge a fee.

Meanwhile, in the second embodiment, the scan translation widget needs to transfer the job tracking data to the provider application 1221 in order to use the translation result data obtained at step S235. Unless the scan translation widget transfers the job tracking data to the provider application 1221, the scan translation widget cannot obtain the common key for decrypting the encrypted translation result data. Accordingly, it is possible to appropriately prevent the widget developer from evading the payment of fees.

Furthermore, according to the second embodiment, a bona fide user can be protected when using a fraudulent widget. An example of a fraudulent widget is a widget 21 that has been developed by a malicious web service provider, and that can be downloaded via the network. Such a widget 21 is for charging improper fees by making a user use a malicious web service. However, with such a web service, the charging degree in the job tracking data cannot be edited because the common key A cannot be obtained in advance. Therefore, improper fees cannot be charged for such a web service. Furthermore, even if the fraudulent widget includes a process of making the intermediate data flow to a malicious web service, the data that flows to the malicious web service is encrypted. Therefore, high security is maintained compared to a case where the data is in plain text, and information leakage can be appropriately prevented.

Furthermore, the provider application 1221 may automatically determine whether the common key is to be transferred to the widget 21, instead of transferring the common key to the widget 21 all the time. For example, when a service provided by the image forming apparatus 10 is specified as the last service in the process flow information of the job tracking information, the data transfer unit 135 of the provider application 1221 does not transfer the common key. In this case, the final product of the process flow is output from the image forming apparatus 10 (for example, by printing or by fax transmission) in the present embodiment. Therefore, it is considered that the need for encrypting the final product is low. Meanwhile, when a service, which is provided elsewhere than the image forming apparatus 10, is specified as the last service in the process flow information of the job tracking information, the data transfer unit 135 transfers the common key to the widget 21. This is because the widget 21 cannot decrypt the final product unless a common key is provided.

When the final product is output by the image forming apparatus 10, and when the widget 21 requests image data corresponding to the final product, the data transfer unit 135 may transfer the image data to the widget 21 instead of transferring a common key. The image data corresponding to the final product corresponds to the print image of the translation result data in the present embodiment. Various kinds of image processing may be performed when printing an image. For example, there are cases where images are combined in order to embed predetermined information in the print image, such as ground tints and barcodes. In an embodiment of the present invention, an image that has undergone such image processing is referred to as a "print image". It may be specified in the widget information as shown in FIG. 21, as to whether the widget 21 is to request the image data corresponding to the final product.

FIG. 21 illustrates an example of widget information including a request for image data corresponding to the final product. In the widget information shown in FIG. 21, the translation copy widget 21C is added at the end of the process flow information. That is to say, when the widget 21 itself is included at the end of the process flow, the data transfer unit 135 transfers, to the widget 21, image data corresponding to the final product to be output by the image forming apparatus 10 (i.e., the image data to be printed out or the image data to be sent by fax transmission). A common key may be transferred together with the image data.

Furthermore, the amount of charged fee may be changed depending on whether the intermediate data is available or unavailable for usage. For example, providing a common key may be considered as a service, and a fee may be charged for providing such a service. In this case, the client side (widget 21) is to have the option of deciding whether to use the service (whether the common key is necessary). Therefore, as shown in FIG. 22, it may be possible to specify whether a common key is necessary in the widget information.

FIG. 22 illustrates an example of widget information including information indicating whether a common key is necessary. The widget information in FIG. 22 includes a key request flag. When the key request flag is "true", it means that a common key is necessary, and when the key request flag is "false", it means that a common key is unnecessary. When the key request flag is "true", a common key is sent to the widget 21.

When the original document includes plural pages, in case 1 of FIG. 15, the data transfer unit 135 transfers a common key to the translation copy widget 21C every time the job tracking data is collected. The common key providing unit 139 updates (generates) a common key after the common key has been transferred to the widget 21, and transfers the updated common key to the OCR server 50 and the translation server 60. Accordingly, the intermediate data and job tracking data are encrypted with different common keys for each of the pages. That is to say, the data transfer unit 135 encrypts the scan image and the job tracking data with different common keys for each of the pages. The OCR server 50 encrypts the OCR result data and job tracking data with different common keys for each of the pages. The translation server 60 encrypts the translation result data and job tracking data with different common keys for each of the pages. As a result, it is possible to prevent the translation copy widget 21C from executing a fraudulent process on the job tracking data of the second page onward by using a common key provided for the first page.

When the original document includes plural pages, in cases 2 and 3 of FIG. 15, the job tracking data corresponding to three pages is collected at once. Therefore, the data transfer unit 135 is to transfer the common key to the translation copy widget 21C when the job tracking data is collected. When case 2 or case 3 is repeatedly executed (for example, when an original document includes a total of nine pages and three pages are processed at a time), similar to case 1, the common key providing unit 139 is to update the common key after a common key has been sent to the translation copy widget 21C.

When an error occurs while encrypting the job tracking data and intermediate data, the charging range is the same as described with reference to FIG. 15.

The present embodiment describes a widget 21 (translation copy widget 21C) in which the first service is executed (scanning is executed) in the image forming apparatus 10. However, the process flow executed by the widget 21 has a high degree of freedom; the starting point of the process flow is not limited to the image forming apparatus 10. For example, there may be a widget 21 that executes an OCR process, a translation process, and a printing process on image data saved in the user terminal 20 (hereinafter, "translation print widget"). The present embodiment is applicable to such a translation print widget, in the same manner as the translation copy widget 21C. That is to say, the processes described with reference to FIGS. 5 and 8 are executed on the translation print widget. When the translation print widget is selected as the execution target, the steps of FIG. 12 are executed except for steps S132 through S134. Therefore, in step S135, a scan image is not transferred, but the job tracking data is transferred to the translation print widget.

The present invention is not limited to the specific embodiments described herein, and variations and modifications may be made without departing from the scope of the present invention.

The present application is based on Japanese Priority Patent Application No. 2009-174608, filed on Jul. 27, 2009, the entire contents of which are hereby incorporated herein by reference.

What is claimed is:

1. An image forming apparatus comprising:
a process information receiving unit configured to receive process information indicating a list of processes used in a process flow requested by an information processing apparatus connected to the image forming apparatus via a network;
a process execution unit configured to execute a first process among the processes in the list, and record, in the process information indicating the list of processes of the process flow, a first item of charging information corresponding to the executed process and a first execution result indicating the first process has been completed by the process execution unit;
a data transfer unit configured to transfer the process information including the list of processes of the process flow, the first item of charging information, and the first execution result to a service providing device that executes a second process among the processes in the list;

a data receiving unit configured to receive from the service providing device the transferred process information, which has been modified by the service providing device to include a second item of charging information corresponding to the second process executed by the service providing device and to include a second execution result indicating the second process has been completed by the service providing device; and a charging information recording unit configured to determine whether the process information includes execution results for all processes in the process list and, in response to a determination that the process information includes execution results for all processes in the process list, record the process information in which the first and second items of the charging information are recorded in association with the corresponding first and second processes in the list.

2. The image forming apparatus according to claim 1, wherein an execution-result information item, indicating an execution result of each of the processes, is recorded in the process information in association with the corresponding process, and the charging information recording unit nullifies the charging information in the process information when the execution-result information item indicating unsuccessful is recorded in the process information.

3. The image forming apparatus according to claim 1, wherein the data transfer unit uses a predetermined encryption key to encrypt the process information, and transfers the encrypted process information to the service providing device, and the data receiving unit receives the encrypted process information that has been encrypted by the service providing device with the use of the predetermined encryption key, and uses the predetermined encryption key to decrypt the received encrypted process information.

4. The image forming apparatus according to claim 3, wherein the data transfer unit uses the predetermined encryption key to encrypt data, which is output by the image forming apparatus as a result of the first process executed by the image forming apparatus and then transferred to the service providing device, and the data receiving unit uses the predetermined encryption key to decrypt data, which is output by the service providing device as a result of the second process executed by the service providing device and then received by the data receiving unit.

5. The image forming apparatus according to claim 4, further comprising:

an encryption key transfer unit configured to transfer the predetermined encryption key to the information processing apparatus, when the items of the charging information relevant to all of the processes in the process flow are recorded in the process information.

6. The image forming apparatus according to claim 5, further comprising:

an encryption key providing unit configured to update the predetermined encryption key and transfer the updated predetermined encryption key to the service providing device, after the encryption key transfer unit has transferred the predetermined encryption key to the information processing apparatus.

7. The image forming apparatus according to claim 5, wherein the encryption key transfer unit transfers the predetermined encryption key to the information processing apparatus when the process information includes a request to transfer the predetermined encryption key.

8. The image forming apparatus according to claim 5, wherein the encryption key transfer unit transfers the predetermined encryption key to the information processing apparatus when the first process executed by the image forming apparatus is a last process in the list of processes.

9. A charging information recording method executed by an image forming apparatus, the charging information recording method comprising:

a process information receiving step of receiving process information indicating a list of processes used in a process flow requested by an information processing apparatus connected to the image forming apparatus via a network;

a process execution step of executing a first process among the processes in the list, and recording, in the process information indicating the list of processes of the process flow, a first item of charging information corresponding to the executed process and a first execution result indicating the first process has been completed;

a data transfer step of transferring the process information including the list of processes of the process flow, the first item of charging information, and the first execution result to a service providing device that executes a second process among the processes in the list;

a data receiving step of receiving from the service providing device the transferred process information, which has been modified by the service providing device to include a second item of charging information corresponding to the second process executed by the service providing device and to include a second execution result indicating the second process has been completed by the service providing device; and a charging information recording step of determining whether the process information includes execution results for all processes in the process list and, in response to a determination that the process information includes execution results for all processes in the process list, recording the process information in which the first and second items of the charging information are recorded in association with the corresponding first and second processes in the list.

10. A non-transitory computer-readable recording medium recording a program that causes an image forming apparatus to execute a method comprising:

a process information receiving step of receiving process information indicating a list of processes used in a process flow requested by an information processing apparatus connected to the image forming apparatus via a network;

a process execution step of executing a first process among the processes in the list, and recording, in the process information indicating the list of processes of the process flow, a first item of charging information corresponding to the executed process and a first execution result indicating the first process has been completed;

a data transfer step of transferring the process information including the list of processes of the process flow, the first item of charging information, and the first execution result to a service providing device that executes a second process among the processes in the list;

a data receiving step of receiving from the service providing device the transferred process information, which has been modified by the service providing device to include a second item of charging information corresponding to the second process executed by the service providing device and to include a second execution result indicating the second process has been completed by the service providing device; and a charging information recording step of determining whether the process information includes execution results for all processes in the process list and, in response to a determination that the process information includes execution results for all processes in the process list, recording the process information in which the first and second items of the charging information are recorded in association with the corresponding first and second processes in the list.

* * * * *